United States Patent
Iwasawa

(10) Patent No.: US 9,148,576 B2
(45) Date of Patent: Sep. 29, 2015

(54) ZOOM LENS AND IMAGING APPARATUS

(71) Applicant: Tamron Co., Ltd., Saitama (JP)

(72) Inventor: Yoshito Iwasawa, Saitama (JP)

(73) Assignee: Tamron Co., Ltd., Saitama (JP)

( * ) Notice: Subject to any disclaimer, the term of this patent is extended or adjusted under 35 U.S.C. 154(b) by 0 days.

(21) Appl. No.: 14/283,680

(22) Filed: May 21, 2014

(65) Prior Publication Data
US 2014/0347522 A1 Nov. 27, 2014

(30) Foreign Application Priority Data
May 22, 2013 (JP) .................................. 2013-108445

(51) Int. Cl.
*G02B 15/14* (2006.01)
*H04N 5/232* (2006.01)
*G02B 15/173* (2006.01)

(52) U.S. Cl.
CPC .......... *H04N 5/23296* (2013.01); *G02B 15/173* (2013.01)

(58) Field of Classification Search
CPC ........ G02B 15/14; G02B 13/009; G02B 9/60; G02B 13/001; G02B 15/22; G02B 13/002; H04N 5/23296
USPC .......................................... 359/676, 684.682
See application file for complete search history.

(56) References Cited

U.S. PATENT DOCUMENTS

2008/0218875 A1 9/2008 Kuroda et al.
2013/0033621 A1* 2/2013 Maruyama ................. 348/240.3

FOREIGN PATENT DOCUMENTS

JP 2006251462 A 9/2006

* cited by examiner

*Primary Examiner* — Alicia M Harrington
(74) *Attorney, Agent, or Firm* — The Webb Law Firm

(57) ABSTRACT

The zoom lens includes at least, in order from an object side: a first lens group G1 having positive refractive power; a second lens group G2 having negative refractive power; a third lens group G3 having positive refractive power; a fourth lens group G4 having negative refractive power; and a fifth lens group G5 having negative refractive power. In the zoom lens, focusing from infinity to a proximity of object is achieved by movement of just fourth lens group toward an image focusing side and is characterized in Satisfaction of expressions below:

[Expression 1]

$$2.1 < \beta rt < 3.5 \qquad (1)$$

$$-1.80 < \beta 2t < -0.94 \qquad (2)$$

where "$\beta rt$" is composite lateral magnification at a telephoto end of lens groups locating closer to the image focusing side than the third lens group at infinity focusing, and "$\beta 2t$" is lateral magnification at a telephoto end of the second lens group at infinity focusing.

8 Claims, 12 Drawing Sheets

ZOOM LENS AND IMAGING APPARATUS

CROSS-REFERENCE TO RELATED APPLICATION

This application claims priority to Japanese Patent Application No. 2013-108445 filed May 22, 2013, the disclosure of which is hereby incorporated in its entirety by reference.

FIELD OF THE INVENTION

The present invention relates to a zoom lens and an imaging apparatus including the zoom lens, and more particularly to a miniature zoom lens having a high variable magnification rate, and an imaging apparatus including the miniature zoom lens.

BACKGROUND ART

Imaging apparatuses using solid state image sensors, such as a digital still camera, have become widespread. In recent years, miniature imaging apparatus systems using miniature solid state image sensors has been rapidly developing. Accordingly, requirement on a miniature zoom lens having high imaging performance have increased depending on market needs for a zoom lens adjusting a focal length depending on an object as an optical systems in the imaging systems. Japanese Patent Laid-Open No. 2006-251462 proposes a miniature zoom lens that achieves high imaging performance all over a zooming range by increasing the number of movable lens groups during zooming to increase degrees of freedom of aberration correction.

SUMMARY OF THE INVENTION

For a zoom lens, not only high imaging performance but also telephotographic performance is required. In particular, strong demand for a telephoto zoom lens with a focal length exceeding 300 mm in terms of 35-mm film exists. Even the zoom lens described in Japanese Patent Laid-Open No. 2006-251462 may achieves high imaging performance by increasing the number of movable lens groups, a focal length at a telephoto end is less than 145 mm in terms of 35-mm film, and does not satisfy the demand for telephotographic performance described above. That is, a zoom lens with a higher variable magnification rate is required.

In miniature imaging apparatus systems, even on such a telephoto zoom lens with a high variable magnification rate, not only reduction of a size in a direction of an overall optical length but also reduction of a diameter of a lens barrel since a miniature imaging apparatus system has a miniature imaging apparatus body. However, although the zoom lens disclosed in Japanese Patent Laid-Open No. 2006-251462 intends to reduce a diameter of a lens barrel by employing a fourth lens group composed of lenses with relatively small diameters as a focus lens group, reduction of size in a direction of an overall optical length is not fully achieved and further miniaturizing of the zoom lens is required.

An object according to the present invention is to provide a telephoto zoom lens achieved high imaging performance, high variable magnification rate and miniaturizing, and provide an imaging apparatus including the zoom lens.

As a result of intensive research of the present inventors, the object is achieved by employing a zoom lens of a telephoto type described below.

The zoom lens according to the present invention at least includes, in order from an object side: a first lens group having positive refractive power; a second lens group having negative refractive power; a third lens group having positive refractive power; a fourth lens group having negative refractive power; and a fifth lens group having negative refractive power. In the zoom lens, focusing from infinity to a proximity of object is achieved by movement of just the fourth lens group toward an image focusing side and is characterized in satisfying expressions below.

[Expression 1]

$$2.1 < \beta rt < 3.5 \tag{1}$$

$$-1.80 < \beta 2t < -0.94 \tag{2}$$

where "βrt" is composite lateral magnification at a telephoto end of lens groups locating closer to the image focusing side than the third lens group at infinity focusing, and "β2t" is lateral magnification at a telephoto end of the second lens group at infinity focusing.

In the zoom lens according to the present invention, it is preferable that the first lens group satisfies the expression below.

[Expression 2]

$$1.2 < f1/\sqrt{(fw \times ft)} < 2.1 \tag{3}$$

where "f1" is a focal length of the first lens group, "fw" is a focal length of the zoom lens at the wide-angle end, and "ft" is a focal length of the zoom lens at the telephoto end.

In the zoom lens according to the present invention, it is preferable that the first lens group satisfies the expression below.

[Expression 3]

$$0.7 < m1/\sqrt{(fw \times ft)} < 1.2 \tag{4}$$

where "m1" is a moving distance of the first lens group for magnification change from the wide-angle end to the telephoto end, "fw" is a focal length of the zoom lens at the wide-angle end, and "ft" is a focal length of the zoom lens at the telephoto end.

In the zoom lens according to the present invention, it is preferable that the fourth lens group satisfies the expression below.

[Expression 4]

$$1.05 < \beta 4t/\beta 4w < 1.45 \tag{5}$$

where "β4t" is lateral magnification at a telephoto end of the fourth lens group, and "β4w" is lateral magnification at a wide-angle end of the fourth lens group.

In the zoom lens according to the present invention, it is preferable that the fourth lens group satisfies the expression below.

[Expression 5]

$$(1-\beta 4t^2) \times \beta zt^2 < -4.5 \tag{6}$$

where "βzt" is lateral magnification at a telephoto end of a lens group locating closer to the image focusing side than the fourth lens group.

In the zoom lens according to the present invention, it is preferable that the third lens group and the fifth lens group move along the same track in magnification change from the wide-angle end to the telephoto end.

In the zoom lens according to the present invention, it is preferable that the fourth lens group first moves toward the image focusing side with respect to the third lens group followed by moving to an object side in magnification change from the wide-angle end to the telephoto end.

The imaging apparatus according to the present invention includes any one of the zoom lenses described above, and an image sensor provided on the image focusing side of the zoom lenses, the image sensor converting an optical image focused by the zoom lens into an electric signal.

Advantages of the Invention

According to the present invention, a miniature telephoto zoom lens applied a telephoto system of so-called a telephoto type achieving not only high imaging performance by minimized movement of each of lens groups during zooming but also high variable magnification rate; and an imaging apparatus including the zoom lens are provided.

DETAILED DESCRIPTION OF THE PREFERRED EMBODIMENTS

Figure 1:
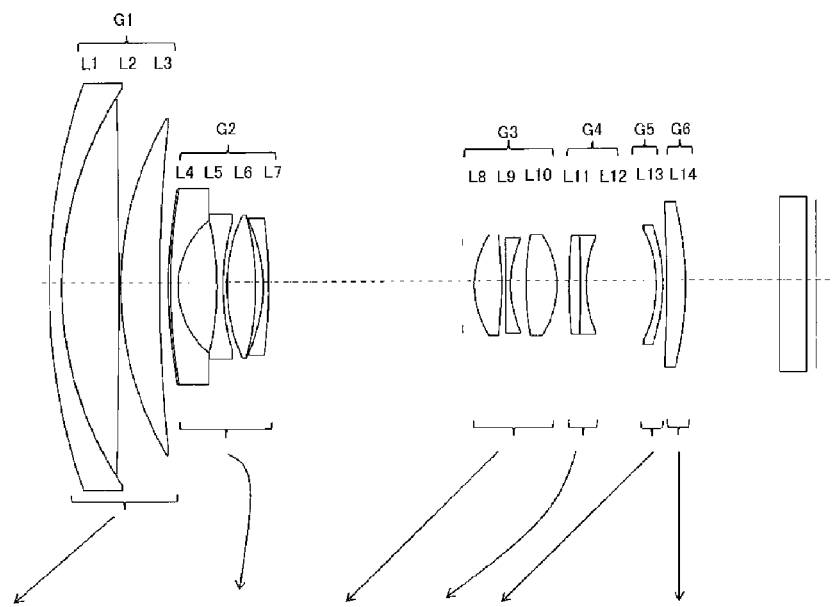
FIG. 1 is a schematic cross-sectional view of the zoom lens of the Example 1 according to the present invention showing a structural example of the zoom lens at a wide-angle end.

Embodiments of the zoom lens and the imaging apparatus according to the present invention will be described below.
1. Zoom Lens
1-1. Structure of an Optical System First, a structure of an optical system of the zoom lens according to the present invention will be described. The zoom lens according to the present invention at least includes, in order from an object side: a first lens group having positive refractive power; a second lens group having negative refractive power; a third lens group having positive refractive power; a fourth lens group having negative refractive power; and a fifth lens group having negative refractive power. In the zoom lens, focusing from infinity to a proximity of object is achieved by movement of just the fourth lens group toward an image focusing side.

The zoom lens according to the present invention is a zoom lens of so-called a telephoto type. The first lens group to the third lens group act as an object side group having positive refractive power as a whole, and the fourth lens group to a final lens group act as an image focusing side group having negative refractive power as a whole. The final lens group is a lens group arranged at the most image focusing side. If there is no lens group following the fifth lens group, the fifth lens group is the final lens group. In the present invention, as the zoom lens is indicated as a telephoto type, overall optical length of the zoom lens at the telephoto end is made to be shorter than a focal length of the zoom lens at a telephoto end. Accordingly, even if a variable magnification rate is increased to a focal length exceeding 300 mm in terms of 35 mm film, for example, increase of an overall optical length at a telephoto end is prevented.

In the present invention, the zoom lens is not only a telephoto type as described above but also arranged the fifth lens group having negative refractive power against the fourth lens group as a focusing lens group at an image focusing side. As each of the fourth lens group and the fifth lens group are designed to have negative refractive power, negative refractive power as a whole in the image focusing side group increases. Thus, even if a variable magnification rate is increased, an overall optical length at a telephoto end can be shorter than a focal length at the telephoto end since it is easy to make a zoom lens have a stronger telephoto tendency.

A zoom lens generally contains one or more inner cylinders in a lens barrel (most outer cylinder) in a telescopic manner. The inner cylinders are drawn to an object side depending to a variable magnification rate. If a difference in overall optical lengths at a telephoto end and a wide-angle end increases, a plurality of inner cylinders is contained in an outer most cylinder to make an overall length of the lens barrel short when the inner cylinders are stored. However, the most outer cylinder containing the plurality of inner cylinders increases a diameter of the most outer cylinder by thicknesses of the inner cylinders. Thus, as a zoom lens with a stronger telephoto tendency is applied in the present invention as described above and increase in an overall optical length at the telephoto end is prevented even if a variable magnification rate is increased, number of the inner cylinders to be contained in the outermost cylinder can be reduced. Thus, reduction of not only the overall optical length at the telephoto end but also an outer diameter of the lens barrel is made possible by the present invention.

1-2. Operation

Next, a focusing and a magnification change in a zoom lens having the structure described above will be described in order.

(1) Focusing

Focusing will be described. In the zoom lens according to the present invention, the fourth lens group acts as a focus lens group as described above, and focusing from infinity to a proximity to object is achieved by movement of just the fourth lens group toward an image focusing side. Reduced movement of the focus lens group during focusing makes the zoom lens miniature since the fourth lens group which acts as a focus lens group has relatively small diameters of the lenses compared with each of lenses constituting an object side group.

To make a zoom lens to be a storing telephoto tendency, increased negative refractive power of an image focusing side group is required as described above. In a conventional zoom lens of a telephoto type, refractive power of the fourth lens group has been set as negative, and refractive power of the fifth lens group has been set as positive, in general. However, if just the fourth lens group acts as a focus lens group having strong refractive power, aberration change and variable magnification action occurs with movement of the fourth lens group during a focusing. Thus, in the present invention, a zoom lens strong in telephoto tendency and aberration change and the variable magnification action during focusing is prevented while preventing the negative refractive power of the fourth lens group from becoming too strong negative refractive power is achieved by providing the fifth lens group following the fourth lens group. In an imaging apparatus without an optical finder, such as a mirror-less interchangeable-lens camera, for example, a user focuses while viewing a live-view image displayed on a liquid crystal screen provided on a back face of a camera body. If the zoom lens according to the present invention is used, display of an image with high imaging performance as a live-view image while preventing a variable magnification action during focusing is made possible. Accordingly, the zoom lens according to the present invention is suitably applied to an imaging apparatus such as a mirror-less interchangeable-lens camera.

(2) Magnification Change

A magnification change will be described. In the zoom lens according to the present invention, an operation of each of lens groups is not especially limited in magnification change. However, in view of obtaining high imaging performance all over a zooming range by improving a degree of freedom of aberration correction, it is preferable to relatively move the lens groups to make distances between each of the lens groups of the first lens group to the fifth lens group change in magnification change. It is because changing of each of distances between each of the lens groups in magnification change makes adjustment of a position of each of the lens groups in each of variable magnification rates to a preferable position for aberration correction easy. In this case, distance between each of the lens groups may change by individually moving each of the lens group or integrally moving some lens groups of all the lens groups and moving residual lens groups separately in magnification change. In addition, some lens groups may be a fixed lens group in spite of all of the lens groups is a mobile lens group.

In view of increasing aberration correction degree of freedom, it is preferable to individually move each of all the lens groups in magnification change. However, in view of manufacturing, it is preferable that in the present invention, the third lens group and the fifth lens group integrally move so as to draw the same track in magnification change. Integral move of the third lens group and the fifth lens group arranged back and forth of the fourth lens group enables the two lens groups to be formed as one unit, and it improves manufacturing efficiency and prevent assembling error. As a result, lens movement mechanism is made simple compared with a case where third lens group and the fifth lens group move separately. In addition, a guide shaft for guiding movement of the fourth lens group can be held from both ends by a lens holding frame for holding each of lens in the third lens group and a lens holding frame for holding each of lens the fifth lens group since the third lens group and the fifth lens group are unitized. Accordingly, easy holding of the guide shaft parallel to an optical axis makes it possible to stably move the fourth lens group and image blurring is prevented.

In addition, it is preferable that in the present invention, the fourth lens group first moves toward the image focusing side with respect to the third lens group followed by moving to an object side in magnification change from the wide-angle end to the telephoto end As such movement of the fourth lens group in magnification change changes a distances between the third lens group and the fourth lens group and the fourth lens group and the fifth lens group depending on a variable magnification rate even if the third lens group and the fifth lens group are moved along the same track, it is preferable for aberration correction.

Since the zoom lens according to the present invention described above is one aspect of the zoom lens according to the present invention, specific lens structure may be appropriately changed within a range without departing from the essence according to the present invention. Although there is no detailed description above, one or more other lens groups following the fifth lens group may be provided as described in the embodiment. The lens groups following the fifth lens group may have either positive refractive power or negative refractive power. However, one of the objects according to the present invention is to provide a miniature zoom lens by reducing increase of an overall optical length at a telephoto end even if a variable magnification rate is increased. Increased number of lens groups constituting an image focusing side group makes it difficult to increase refractive power to be allocated to each of the lens groups. As a result, weakened telephoto tendency makes it difficult to optically prevent increase of the overall optical length at the telephoto end. In addition, increased number of the lens groups makes the overall optical length physically increase as well. Thus, in view of providing a miniature zoom lens, the number of the lens groups following the fifth lens group is preferably one or less.

1-3. Expressions

Expressions which the zoom lens according to the present invention should or preferably satisfy will be described. The zoom lens according to the present invention should satisfy expressions (1) and (2) described below, and it is preferable to satisfy expressions (3) to (6) described later.

[Expression 6]

$$2.1 < \beta rt < 3.5 \tag{1}$$

$$-1.80 < \beta 2t < -0.94 \tag{2}$$

where "$\beta rt$" is composite lateral magnification at a telephoto end of lens groups locating closer to the image focusing side than the third lens group at infinity focusing, and "$\beta 2t$" is lateral magnification at a telephoto end of the second lens group at infinity focusing.

1-3-1. Expression (1)

First, the expression (1) will be described. The expression (1) defines lateral magnification of a lens group arranged closer to the image focusing side than the third lens group in the zoom lens according to the present invention. An image focusing side group includes the fourth lens group to a final lens group, and the "$\beta rt$" is composite lateral magnification among the fourth lens group to the final lens group. In addition, the final lens group is a lens group arranged at the most image focusing side in all the lens groups constituting the zoom lens. If there is no lens group following the fifth lens group, the fifth lens group corresponds to the final lens group.

Satisfaction of the expression (1) enables a zoom lens achieved not only high variable magnification rate but also a high imaging performance and further achieves miniaturization. In addition, satisfaction of the expression (1) secures a proper flange back size required for an imaging apparatus such as a mirror-less interchangeable-lens camera, for example.

If magnification is equal to or less than a lower limit value of the expression (1), focal length of an object side group (a first lens group to a third lens group) should be increased to achieve telephotographic performance since lateral magnification in the image focusing side group becomes small. As a result, miniaturization of the zoom lens in a radial direction is made difficult since a diameter of each of lenses constituting the object side group becomes large. Further, reduction of an overall optical length is made difficult also. In contrast, if magnification is equal to or more than an upper limit value of the expression (1), many lenses are required for aberration correction to obtain high imaging performance since the lateral magnification in the image focusing side group becomes too large, i.e. increased number of lenses constituting an optical system of the zoom lens increase the overall optical length. Magnification out of the range of the expression (1) is not preferable since miniaturization of the zoom lens is made hard.

In view of the matters above, it is more preferable that the expression (1) satisfies a condition below to obtain the effect described above.

$$2.2 < \beta rt < 3.5 \tag{1}'$$

In addition, it is further preferable that the expression (1) satisfies a condition below to obtain the effect described above.

$$2.3 < \beta rt < 3.5 \tag{1}''$$

1-3-2. Expression (2)

Next, the expression (2) will be described. The expression (2) defines lateral magnification at a telephoto end of the second lens group in the zoom lens according to the present invention. Satisfaction of the expression (2) makes lateral magnification at the telephoto end of the second lens group a proper value, and the overall optical length at the telephoto end and aberration correction is adjusted properly. If magnification is equal to or less than a lower limit value of the expression (2), many lenses are required for aberration correction to obtain high imaging performance since the lateral magnification of the second lens group becomes too large. As a result, the overall optical length at the telephoto end increases. In contrast, if magnification is equal to or more than upper limit value of the expression (2), the lateral magnification in the image focusing side group should be increased to achieve a high variable magnification rate since the lateral magnification of the second lens group becomes small. As a result, miniaturization of the zoom lens in the radial direction is made difficult due to the same reason as that described in the expression (1), and reduction of the overall optical length is made difficult. Magnification of out of the range in the expression (1) or the expression (2) is not preferable since miniaturization of the zoom lens is made difficult. As is apparent in the descriptions above, the zoom lens achieving a high variable magnification rate and miniaturization, it is required to satisfy both the expression (1) and the expression (2) in the present invention in order to obtain a telephoto zoom lens having high imaging performance.

In view of the matters above, it is more preferable that the expression (2) satisfies a condition below to obtain the effect above.

$$-1.60 < \beta 2t < -0.94 \tag{2}'$$

In addition, it is further preferable that the expression (2) satisfies a condition below to obtain the effect above.

$$-1.50 < \beta 2t < -0.94 \tag{2}''$$

1-3-3. Expression (3)

Next, the expression (3) will be described. In the zoom lens according to the present invention, it is preferable that the first lens group satisfies the expression (3) below.

[Expression 7]

$$1.2 < f1/\sqrt{(fw \times ft)} < 2.1 \tag{3}$$

where "f1" is a focal length of the first lens group, "fw" is a focal length of the zoom lens at the wide-angle end, and "ft" is a focal length of the zoom lens at the telephoto end.

The expression (3) defines a focal length of the first lens group. Satisfaction of the expression (3) enables a movement of the first lens group in magnification change to be within a proper range. Thus, it is preferable for miniaturization of the zoom lens since high imaging performance can be achieved while preventing an increase of the number of lenses for aberration correction.

If magnification is equal to or less than a lower limit value of the expression (3), axial color aberration at the telephoto end is deteriorated since refractive power of the first lens group is too large. As a result, many lenses should be provided for aberration correction to achieve high imaging performance. Therefore, it is not preferable in view of miniaturization of the zoom lens since increased number of lenses increases the overall optical length. In contrast, if magnification is equal to or more than upper limit value of the expression (3), movement of the first lens group in magnification change increases since refractive power of the first lens group is small. As a difference in overall optical lengths at the telephoto end and the wide-angle end increases, the number of inner cylinders to be stored in an outer cylinder increases or a mechanism for driving the inner cylinders is made complicate. It is unfavorable since a lens barrel structure is made complicated and an outer diameter of the lens barrel may also increase.

In view of the matters above, it is more preferable that the expression (3) satisfies a condition below to obtain the effect above.

$$1.35 < f1/\sqrt{(fw \times ft)} < 2.00 \tag{3}'$$

In addition, it is further preferable that the expression (3) satisfies a condition below to obtain the effect described above.

$$1.35 < f1/\sqrt{(fw \times ft)} < 1.90 \tag{3}''$$

1-3-4. Expression (4)

Next, the expression (4) will be described. In the zoom lens according to the present invention, it is more preferable that the first lens group satisfies the expression (4) below.

[Expression 8]

$$0.7 < m1/\sqrt{(fw \times ft)} < 1.2 \tag{4}$$

where "m1" is a moving distance of the first lens group for magnification change from the wide-angle end to the telephoto end, "fw" is a focal length of the zoom lens at the wide-angle end, and "ft" is a focal length of the zoom lens at the telephoto end.

The expression (4) defines a movement of the first lens group in magnification change from the wide-angle end to the telephoto end. Satisfaction of the expression (4) keeps a difference in overall optical lengths at a telephoto end and a wide-angle end within a proper range. That is, it is preferable to satisfy the expression (4) for miniaturization of the zoom lens.

If magnification is equal to or less than a lower limit value of the expression (4), refractive power of each of the lens groups should be increased to achieve a high variable magnification rate since a movement of the first lens groups decreases. In addition, if the refractive power of each of the lens groups increases, many lenses are required for aberration correction to achieve high imaging performance. So, it is not preferable in view of miniaturization of the zoom lens since increased number of lenses increases the overall optical length. In contrast, if magnification is equal to or more than upper limit value of the expression (4), a movement of the first lens group increases. So, it is not preferable that a lens barrel structure is made complicate due to the same reason as described above, and an outer diameter of the lens barrel may increase since a difference in overall optical lengths at the telephoto end and the wide-angle end increases.

In view of the matters above, it is more preferable that the expression (4) satisfies a condition below to obtain the effect above.

$$0.75 < m1/\sqrt{(fw \times ft)} < 1.15 \tag{4}'$$

1-3-5. Expression (5)

In the zoom lens according to the present invention, it is preferable that the fourth lens group satisfies the expression (5) below.

[Expression 9]

$$1.05 < \beta 4t/\beta 4w < 1.45 \tag{5}$$

where "$\beta 4t$" is lateral magnification at a telephoto end of the fourth lens group, and "$\beta 4w$" is lateral magnification at a wide-angle end of the fourth lens group.

The expression (5) defines a variable magnification ratio of the fourth lens group. In the zoom lens according to the present invention, the fourth lens group acts as a focus lens group as described above, and just the fourth lens group moves during focusing. Since satisfaction of the expression (5) enables variable magnification ratios from the wide-angle end to the telephoto end in the fourth lens group to be within a proper range, aberration change and variable magnification action during focusing described above can be prevented easily. As a result, the effect described above obtained by making just the fourth lens group as the focus lens group increases.

1-3-6. Expression (6)

In the zoom lens according to the present invention, it is more preferable that the fourth lens group satisfies the expression (6) below.

[Expression 10]

$$(1-\beta 4t^2) \times \beta zt^2 < -4.5 \tag{6}$$

where "$\beta zt$" is lateral magnification at a telephoto end of a lens group locating closer to the image focusing side than the fourth lens group.

The expression (6) defines focus sensitivity at a telephoto end of the fourth lens group. If composite lateral magnification at a telephoto end of a lens group positioned closer to the image focusing side than the fourth lens group, namely, composite lateral magnification at a telephoto end of a lens group following the fifth lens group satisfy the expression (6), a movement of the fourth lens group during focusing can be adjusted within a proper range since focus sensitivity at a telephoto operation is properly adjusted. If the value is equal to or more than upper limit value of the expression (6), movement of the fourth lens group during focusing increases since the focus sensitivity becomes small, i.e. it is not preferable for miniaturization of the zoom lens.

2. Imaging Apparatus

Next, the imaging apparatus according to the present invention will be described. The imaging apparatus according to the present invention includes the zoom lens described above, and an image sensor provided on the image focusing side of the zoom lens, the image sensor converting an optical image focused by the zoom lens into an electric signal. There is no specific limitation on the image sensor. However, as described above, the zoom lens is suitable for an imaging apparatus of a type without an optical finder and a reflex mirror since a flange back of the zoom lens according to the present invention is short. In particular, therefore, it is preferable that the imaging apparatus acts as a miniature imaging apparatus provided with a miniature image sensor such as so-called mirror-less interchangeable-lens camera since the zoom lens according to the present invention is small and achieves a high variable magnification rate.

The present invention will be specifically described by showing Examples and Comparative Examples. Note that the present invention is not limited to the Examples below, and lens structures described in the Examples just exemplify the zoom lens according to the present invention. Of course, the lens structure of the zoom lens according to the present invention can be appropriately arranged within a range without departing from the essence of the present invention.

Example 1

(1) Example of a Lens Structure of a Zoom Lens

FIG. 1 shows a lens structure of a zoom lens of the Example 1. As shown in FIG. 1, the zoom lens of the Example 1 is composed of, in order from an object side: a first lens group G1 having positive refractive power; a second lens group G2 having negative refractive power; a third lens group G3 having positive refractive power; a fourth lens group G4 having negative refractive power; a fifth lens group G5 having negative refractive power; and a sixth lens group G6 having positive refractive power.

The first lens group G1 is composed of: in order from the object side, a cemented lens in which a meniscus lens L1 having a negative refractive power and provided a convex surface at the object side and a lens L2 having positive refractive power are cemented; and a meniscus lens L3 having a positive refractive power and provided a convex surface at the object side. The second lens group G2 is composed of: in order from the object side, a meniscus lens L4 having negative refractive power provided an aspherical surface at object side and a concave surface having a large curvature at the image focusing side, a biconcave lens L5; a biconvex lens L6; and a meniscus lens L7 having negative refractive power provided a concave surface at the object side. The third lens group G3 is composed of: in order from the object side, a biconvex lens L8 provided an aspherical surface at both sides; a biconcave lens L9; and biconvex lens L10. The fourth lens group G4 is composed of: a cemented lens in which a biconvex lens L11 and a biconcave lens L12 provided an aspherical surface at image focusing side in order from the object side are cemented. The fifth lens group G5 is composed of a meniscus lens L13 having negative refractive power provided a concave surface at the object side. The sixth lens group G6 is composed of a meniscus lens L14 having positive refractive power provided a convex surface at the image focusing side.

In the zoom lens of the Example 1 having the structure described above, each of the lens groups moves as follows as shown in FIG. 1 with an arrow in magnification change from a wide-angle end to a telephoto end. The first lens group G1 moves toward the object side; the second lens group G2 moves toward the image focusing side along a convex track; the third lens group G3 moves toward the object side; the fourth lens group G4 moves toward the image focusing side with respect to the third lens group G3 along a convex track; the fifth lens group G5 moves toward the object side; and the sixth lens group G6 is a fixed lens group and is fixed with respect to the focusing surface. In addition, the fourth lens group G4 moves toward the image focusing side during focusing from infinity to a proximity object.

(2) Numeric Values in Example

In the Example 1, Table 1 shows lens data of a numeric values in Example 1 to which specific numeric values are applied. The lens data shown in Table 1 is as follows. "NS" is a face number of a lens and designates order of lens surfaces from the object side; "R" is a curvature radius of a lens surface; "D" is a distance between lens surfaces adjacent to each other along an optical axis; "Nd" is a refractive index with respect to a d-line (wavelength λ of 587.6 nm); and "vd" is an Abbe number with respect to the d-line (wavelength λ of 587.6 nm). In addition, a diaphragm is shown as a symbol of "S" in FIG. 1. In Table 1, "STOP" is a face number of the diaphragm (opening diaphragm). If a lens surface is an aspherical surface, "ASPH" is a face number, and a paraxial curvature radius is shown in a section of the curvature radius "R".

TABLE 1

| NS | R | D | Nd | vd |
|---|---|---|---|---|
| 1 | 63.6829 | 1.3000 | 1.91048 | 31.31 |
| 2 | 36.5043 | 0.0100 | 1.57046 | 42.84 |
| 3 | 36.5043 | 5.9600 | 1.49845 | 81.61 |
| 4 | −852.9715 | 0.2000 | | |
| 5 | 34.2606 | 4.0000 | 1.62032 | 63.39 |
| 6 | 151.8569 | D(6) | | |
| 7 ASPH | 54.3406 | 0.2000 | 1.51700 | 49.96 |
| 8 | 54.6285 | 0.8000 | 1.91695 | 35.25 |
| 9 | 8.9090 | 4.0317 | | |
| 10 | −30.8661 | 0.6500 | 1.91695 | 35.25 |
| 11 | 23.5188 | 0.4000 | | |
| 12 | 17.7113 | 2.9807 | 1.93323 | 20.88 |
| 13 | −28.4855 | 0.7683 | | |
| 14 | −16.2247 | 0.6000 | 1.77621 | 49.62 |
| 15 | −51.4542 | D(15) | | |
| 16 STOP | 0.0000 | 1.2000 | | |
| 17 ASPH | 9.1792 | 2.8596 | 1.58547 | 59.46 |
| 18 ASPH | −21.2748 | 0.3952 | | |
| 19 | −469.2779 | 0.5000 | 1.89461 | 30.74 |
| 20 | 11.3473 | 1.6070 | | |
| 21 | 27.4927 | 3.2402 | 1.59489 | 68.62 |
| 22 | −9.5668 | D(22) | | |
| 23 | 48.0920 | 1.2000 | 1.81263 | 25.46 |
| 24 | −93.4000 | 0.0100 | 1.57046 | 42.84 |
| 25 | −93.4000 | 0.6000 | 1.80558 | 45.45 |
| 26 ASPH | 13.0486 | D(26) | | |
| 27 | −12.9322 | 0.6300 | 1.81263 | 25.46 |
| 28 | −18.8160 | D(28) | | |
| 29 | −147.0832 | 1.9501 | 1.73234 | 54.67 |
| 30 | −35.3238 | 9.8000 | | |
| 31 | 0.0000 | 2.8000 | 1.51872 | 64.20 |
| 32 | 0.0000 | 1.0000 | | |

In addition, Table 2 shows coefficients and conic constants of aspherical surface shown in Table 1 where a shape of an aspherical surface is expressed by a following expression X(y).

$$X(y)=(y^2/R)/[1+(1-\epsilon \cdot y^2/R^2)^{1/2}]+A4 \cdot y^4+A6 \cdot y^6+A8 \cdot y^8+A10 \cdot y^{10}$$

In the expression, "X(y)" is a distance (sagging amount) from a peak of each of aspherical surfaces at a height y from the optical axis in a vertical direction, along the optical axis direction, and "R" is a curvature radius (paraxial curvature radius) of a reference sphere surface, "ε" is a conic coefficient, and each of "A4, A6, A8, and A10" are an aspherical surface coefficient.

TABLE 2

| ASPH | ϵ | A4 | A6 | A8 | A10 |
|---|---|---|---|---|---|
| 7 | 1.0000 | 1.91163e−005 | −4.04139e−007 | 3.49343e−009 | −1.49337e−011 |
| 17 | 1.0000 | −1.14585e−004 | 4.99824e−006 | −1.46840e−007 | −1.08200e−009 |
| 18 | 1.0000 | 4.60442e−004 | 5.38067e−006 | −2.32614e−007 | 0.00000e+000 |
| 26 | 1.0000 | −6.79774e−006 | −5.35988e−008 | 4.43501e−009 | −9.66065e−011 |

Next, Table 3 shows a face distance in a wide-angle end (f=10.30), an intermediate focal length (f=30.47), and a telephoto end (f=97.97) in the numeric values in Example 1 as well as a focal length (f), an F-number (F-No.), and a field angle (ω).

TABLE 3

| f | 10.30 | 30.47 | 97.97 |
|---|---|---|---|
| F-No. | 3.6490 | 5.0069 | 5.7049 |
| ω | 40.281 | 11.231 | 4.671 |
| D(6) | 0.9300 | 15.4076 | 32.7201 |
| D(15) | 20.1523 | 7.8284 | 1.9719 |
| D(22) | 1.2330 | 2.6313 | 1.5000 |
| D(26) | 7.2929 | 5.8946 | 7.0259 |
| D(28) | 0.4190 | 11.1985 | 17.2290 |

Table 4 shows a face distance during focusing on an proximity object in a wide-angle end (f=10.30), an intermediate focal length (f=30.47), and a telephoto end (f=97.97) in the numeric values in Example 1 as well as a focal length (f) during focusing on an infinite object, and a distance (D(0)) from a first lens surface to an object.

TABLE 4

| f | 10.30 | 30.47 | 97.97 |
|---|---|---|---|
| D(0) | 920.28 | 903.19 | 889.86 |
| D(22) | 1.2704 | 3.3008 | 2.9038 |
| D(26) | 7.2555 | 5.2251 | 5.6221 |

Figure 2:
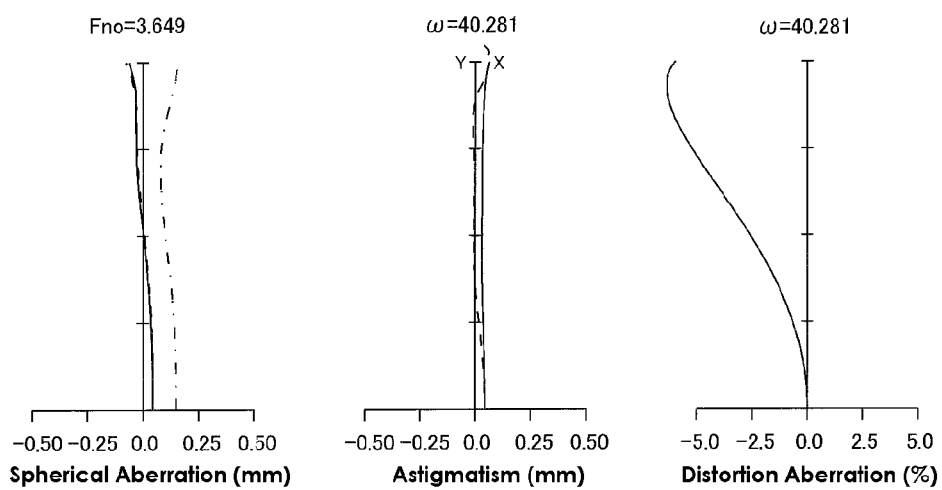
FIG. 2 includes a spherical aberration graph, an astigmatism graph, and a distortion aberration graph at the wide-angle end focusing infinity in the zoom lens of the Example 1 according to the present invention.
Figure 3:
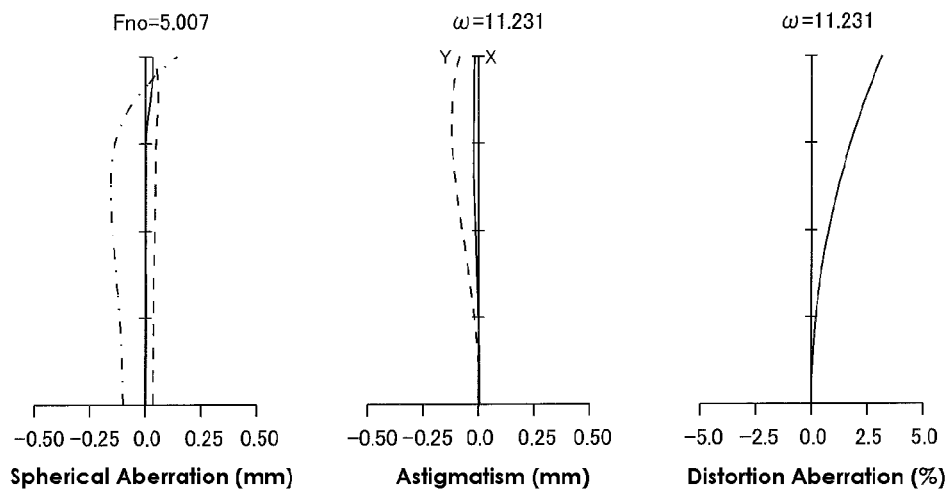
FIG. 3 includes a spherical aberration graph, an astigmatism graph, and a distortion aberration graph at the intermediate focal length focusing infinity in the zoom lens of the Example 1 according to the present invention.
Figure 4:
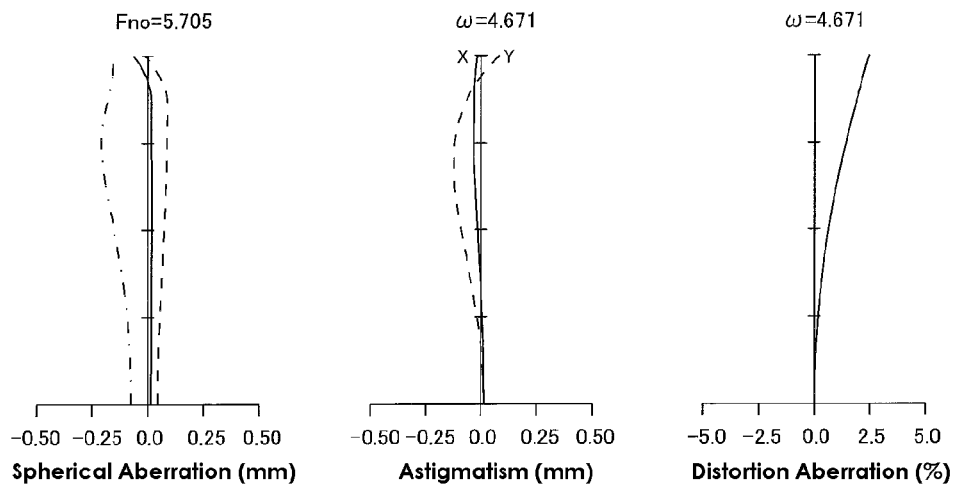
FIG. 4 includes a spherical aberration graph, an astigmatism graph, and a distortion aberration graph at a telephoto end focusing infinity in which the zoom lens of the Example 1 according to the present invention.

FIG. 2 shows spherical aberration, astigmatism, and distortion aberration, during focusing on infinity of the zoom lens of the numeric values in Example 1 above in a wide-angle end. FIG. 3 shows spherical aberration, astigmatism, and distortion aberration, during focusing on infinity of the zoom lens in an intermediate focal length. FIG. 4 shows spherical aberration, astigmatism, and distortion aberration, during focusing on infinity of the zoom lens in a telephoto end. In each of spherical aberration graphs, a ratio of pupil diameters is shown in a vertical axis, and a defocus amount is shown in a horizontal axis, in the graphs, a solid line, a broken line, and dashed lines show spherical aberrations in a d-line, a C-line, and a g-line, respectively. In each of astigmatism graphs, an image height is shown in the vertical axis, and a defocus amount is shown in the horizontal axis. In the graphs, a solid line shows a sagittal focusing surface, and a broken line shows a meridional focusing surface. In addition, in each of distortion aberration graphs, an image height is shown in the vertical axis, and the horizontal axis shows percentage. The same is applied to FIGS. 6 to 8, FIGS. 10 to 12, FIGS. 14 to 16, FIGS. 18 to 20, and FIGS. 22 to 24, which are described later.

Example 2

(1) Example of a Lens Structure of a Zoom Lens

Figure 5:
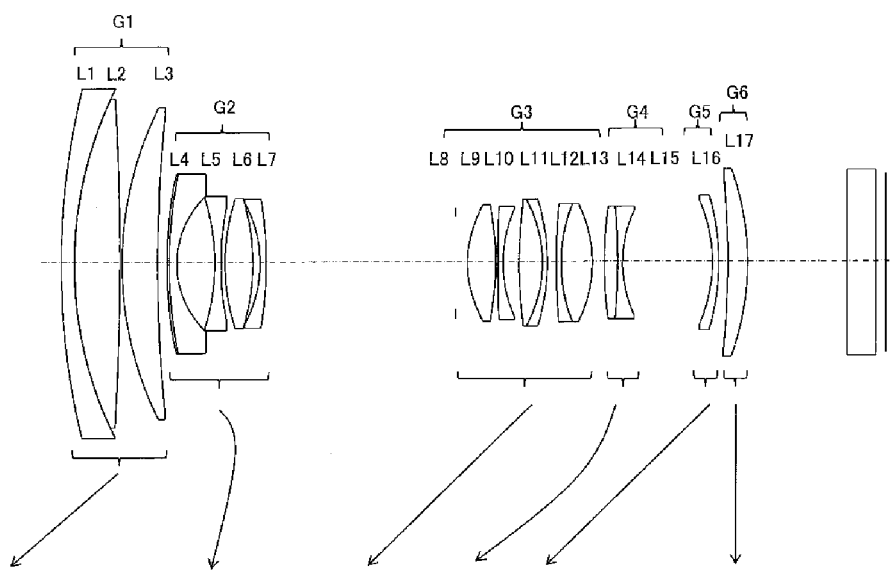
FIG. 5 is a schematic cross-sectional view of the zoom lens of the Example 2 according to the present invention showing a structure of the zoom lens at a wide-angle end.

FIG. 5 shows a lens structure of a zoom lens of the Example 2. As shown in FIG. 5, the zoom lens of the Example 2 is composed of, in order from an object side: a first lens group G1 having positive refractive power; a second lens group G2 having negative refractive power; a third lens group G3 having positive refractive power; a fourth lens group G4 having negative refractive power; a fifth lens group G5 having negative refractive power; and a sixth lens group G6 having positive refractive power.

The first lens group G1 is composed of: in order from the object side, a cemented lens in which a meniscus lens L1 having a negative refractive power provided a convex surface at the object side, and a lens L2 having positive refractive power, are cemented; and a meniscus lens L3 having a positive refractive power provided a convex surface at the object side. The second lens group G2 is composed of: in order from the object side, a meniscus lens L4 having a large curvature provided an aspherical surface at the object side and a concave surface at the image focusing side, the meniscus lens L4 having negative refractive power; a biconcave lens L5; a biconvex lens L6; and a meniscus lens L7 having negative refractive power provided a concave surface at the object side. The third lens group G3 is composed of: in order from the object side, a biconvex lens L8 provided an aspherical surface at both sides; a negative lens L9 provided a concave surface at the image focusing side; a cemented lens in which a biconvex lens L10 provided an aspherical surface at the object side and a meniscus lens L11 having negative refractive power provided a concave surface at the object side are cemented; and a cemented lens in which a meniscus lens L12 having negative refractive power provided a concave surface at the image focusing side and a biconvex lens L13 are cemented. The fourth lens group G4 is composed of: a cemented lens in which in order from the object side, a biconvex lens L14 and a biconcave lens L15 are cemented. The fifth lens group G5 is composed of a meniscus lens L16 having negative refractive power provided a concave surface at the object side. The sixth lens group G6 is composed of a meniscus lens L17 having positive refractive power provided a convex surface at the image focusing side.

In the zoom lens of the Example 2 having the structure described above, each of the lens groups moves as follows in magnification change from a wide-angle end to a telephoto end as shown in FIG. 5 with an arrow: the first lens group G1 moves toward the object side; the second lens group G2 moves toward the image focusing side along a convex track; the third lens group G3 moves toward the object side; the fourth lens group G4 moves toward the image focusing side with respect to the third lens group G3 along a convex track; the fifth lens group G5 moves toward the object side; and the sixth lens group G6 acts as a fixed lens group and is fixed with respect to the focusing surface. In addition, the fourth lens group G4 moves toward the image focusing side during focusing from infinity to a proximity object.

(2) Numeric Values in Example

In the Example 2, Table 5 shows lens data of a numeric values in Example 2 to which specific numeric values are applied. The lens data shown in Table 5 is similar to the lens data shown in Table 1.

TABLE 5

| NS | R | D | Nd | vd |
|---|---|---|---|---|
| 1 | 71.8184 | 1.3000 | 1.91048 | 31.31 |
| 2 | 38.1169 | 0.0100 | 1.57046 | 42.84 |
| 3 | 38.1169 | 4.5000 | 1.49845 | 81.61 |
| 4 | −271.5053 | 0.2000 | | |
| 5 | 34.2543 | 3.5128 | 1.62032 | 63.39 |
| 6 | 144.7606 | D(6) | | |
| 7 ASPH | 51.0704 | 0.2000 | 1.51700 | 49.96 |
| 8 | 43.5620 | 0.7600 | 1.91695 | 35.25 |
| 9 | 9.1890 | 3.7360 | | |
| 10 | −21.5757 | 0.6040 | 1.91695 | 35.25 |
| 11 | 29.1538 | 0.4000 | | |
| 12 | 20.4299 | 2.7524 | 1.93323 | 20.88 |
| 13 | −21.6790 | 0.7155 | | |
| 14 | −12.4871 | 0.5960 | 1.77621 | 49.62 |
| 15 | −39.8843 | D(15) | | |
| 16 STOP | 0.0000 | 1.2000 | | |
| 17 ASPH | 10.5362 | 2.8018 | 1.58547 | 59.46 |
| 18 ASPH | −22.5427 | 0.2000 | | |
| 19 | 158.7690 | 0.5000 | 1.83945 | 42.72 |
| 20 | 12.7924 | 1.5947 | | |
| 21 ASPH | 43.3184 | 2.3000 | 1.58547 | 59.46 |
| 22 | −12.8698 | 0.0100 | 1.57046 | 42.84 |
| 23 | −12.8698 | 0.4670 | 1.91048 | 31.31 |
| 24 | −21.0076 | 0.8760 | | |
| 25 | 64.1680 | 0.4670 | 1.91695 | 35.25 |
| 26 | 15.3783 | 0.0100 | 1.57046 | 42.84 |
| 27 | 15.3783 | 3.0765 | 1.62032 | 63.39 |
| 28 | −13.0505 | D(28) | | |
| 29 | 41.5408 | 1.3000 | 1.81263 | 25.46 |
| 30 | −58.6162 | 0.0100 | 1.57046 | 42.84 |
| 31 | −58.6162 | 0.4830 | 1.80831 | 46.50 |
| 32 | 12.0837 | D(32) | | |
| 33 | −15.2307 | 0.6300 | 1.81263 | 25.46 |
| 34 | −23.6034 | D(34) | | |
| 35 | −87.2068 | 1.9569 | 1.73234 | 54.67 |
| 36 | −27.2049 | 9.8000 | | |
| 37 | 0.0000 | 2.8000 | 1.51872 | 64.20 |
| 38 | 0.0000 | 1.0000 | | |

Table 6 shows aspherical surface coefficients and conic constants of the aspherical surface shown in Table 5 as well as Table 2 showing aspherical surface coefficients and conic constants.

TABLE 6

| ASPH | ε | A4 | A6 | A8 | A10 |
|---|---|---|---|---|---|
| 7 | 1.0000 | 2.99229e−005 | −2.77911e−007 | 4.08113e−009 | −6.45590e−012 |
| 17 | 1.0000 | −9.24021e−005 | −2.03212e−006 | 1.09833e−007 | −3.07901e−009 |
| 18 | 1.0000 | 2.42296e−004 | −3.20842e−006 | 1.17483e−007 | −3.05003e−009 |
| 21 | 1.0000 | −1.20912e−005 | −1.01954e−006 | 2.87946e−008 | −2.68033e−010 |

Next, Table 7 shows a face distance in a wide-angle end (f=10.30), an intermediate focal length (f=30.47), and a telephoto end (f=97.97) in the numeric values in Example 1 as well as a focal length (f), an F-number (F-No.), and a field angle (ω).

TABLE 7

| f | 11.22 | 63.64 | 145.52 |
|---|---|---|---|
| F-No. | 3.6414 | 5.3644 | 5.7509 |
| ω | 37.997 | 9.208 | 3.170 |
| D(6) | 0.9300 | 21.8749 | 36.7527 |
| D(15) | 18.6221 | 4.8769 | 1.4250 |
| D(28) | 1.1900 | 4.2490 | 1.0100 |
| D(32) | 8.4421 | 5.7832 | 20.15329.0221 |
| D(34) | 0.8860 | 15.9875 | |

Table 8 shows a face distance during focusing on an proximity object in a wide-angle end (f=11.22), an intermediate focal length (f=63.64), and a telephoto end (f=145.52) in the numeric values in Example 2 as well as a focal length (f) during focusing on an infinite object, and a distance (D(0)) from a first lens surface to an object.

TABLE 8

| f | 11.22 | 63.64 | 145.52 |
|---|---|---|---|
| D(0) | 918.76 | 896.55 | 880.86 |
| D(28) | 1.2267 | 4.6723 | 3.4247 |
| D(32) | 8.8054 | 5.3598 | 6.6074 |

Figure 6:
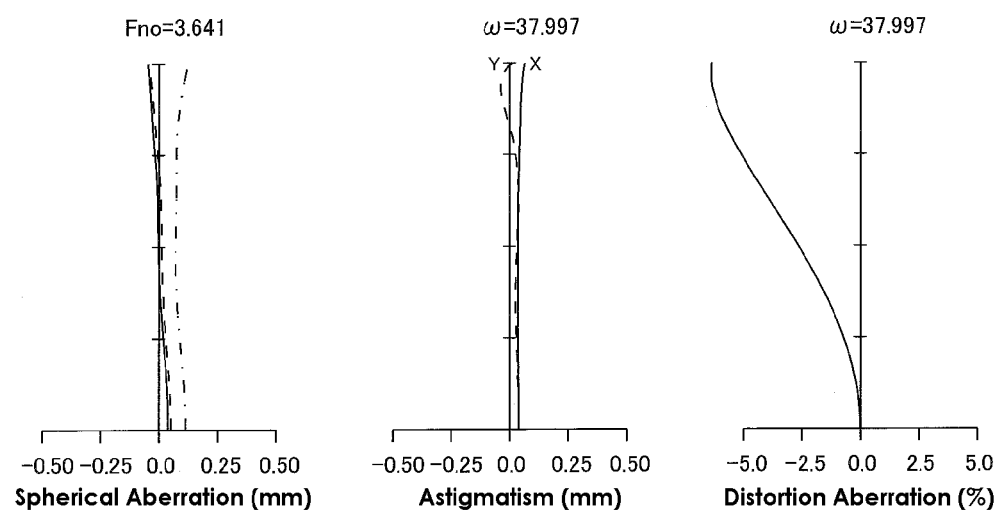
FIG. 6 includes a spherical aberration graph, an astigmatism graph, and a distortion aberration graph at a wide-angle end focusing infinity in the zoom lens of the Example 2 according to the present invention.
Figure 7:
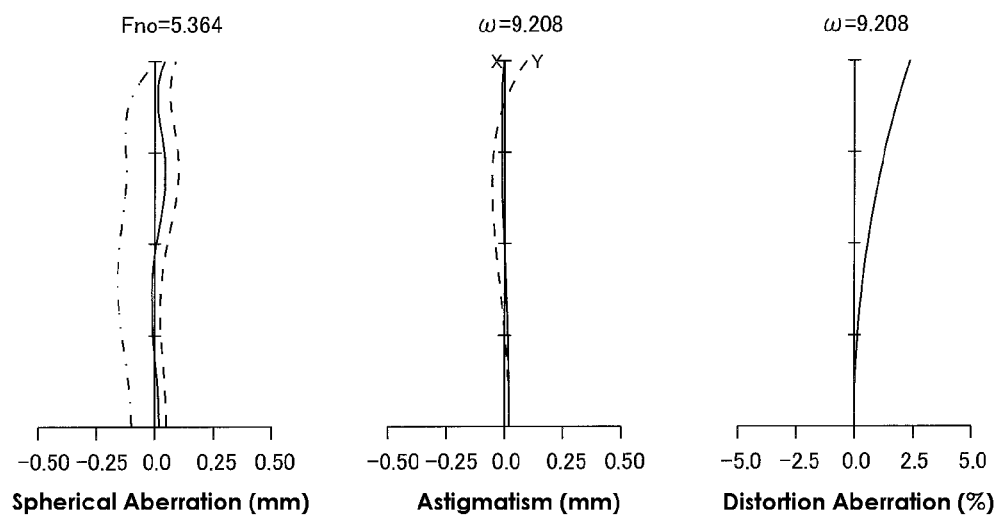
FIG. 7 includes a spherical aberration graph, an astigmatism graph, and a distortion aberration graph at an intermediate focal length focusing infinity in the zoom lens of the Example 2 according to the present invention.
Figure 8:
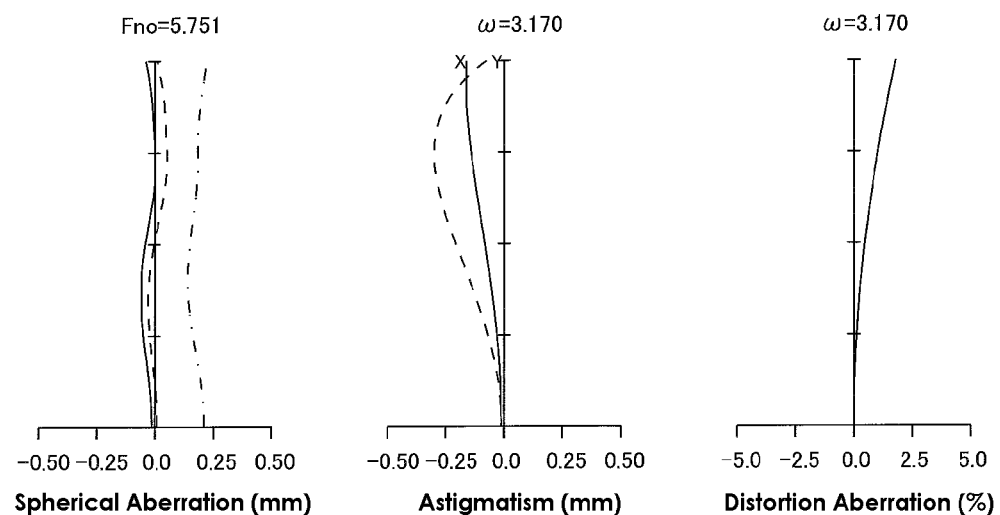
FIG. 8 includes a spherical aberration graph, an astigmatism graph, and a distortion aberration graph at a telephoto end focusing infinity, in the zoom lens of the Example 2 according to the present invention.

FIG. 6 shows spherical aberration, astigmatism, and distortion aberration, during focusing on infinity of the zoom lens of the numeric values in Example 2 above in a wide-angle end. FIG. 7 shows spherical aberration, astigmatism, and distortion aberration, during focusing on infinity of the zoom lens in an intermediate focal length. FIG. 8 shows spherical aberration, astigmatism, and distortion aberration, during focusing on infinity of the zoom lens in a telephoto end.

Example 3

(1) Example of a Structure of a Zoom Lens

Figure 9:
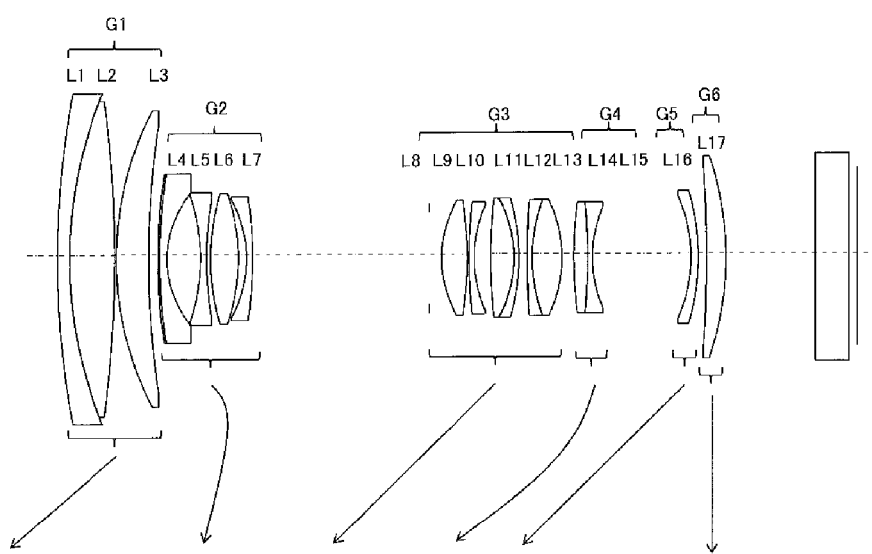
FIG. 9 is a schematic cross-sectional view of the zoom lens of the Example 3 according to the present invention showing a structure of the zoom lens at a wide-angle end.

FIG. 9 shows a lens structure of a zoom lens of the Example 3. As shown in FIG. 9, the zoom lens of the Example 3 is composed of, in order from an object side: a first lens group G1 having positive refractive power; a second lens group G2 having negative refractive power; a third lens group G3 having positive refractive power; a fourth lens group G4 having negative refractive power; a fifth lens group G5 having negative refractive power; and a sixth lens group G6 having positive refractive power.

The first lens group G1 is composed of: in order from the object side, a cemented lens in which a meniscus lens L1 having a negative refractive power provided a convex surface at the object side, and a lens L2 having positive refractive power are cemented; and a meniscus lens L3 having a positive refractive power provided a convex surface at the object side.

The second lens group G2 is composed of: in order from the object side, a meniscus lens L4 having a large curvature provided an aspherical surface at the object side and a concave surface at the image focusing side, the meniscus lens L4 having negative refractive power; a biconcave lens L5; a biconvex lens L6; and a meniscus lens L7 having negative refractive power provided a concave surface at the object side. The third lens group G3 is composed of: in order from the object side, a biconvex lens L8 provided an aspherical surface at both sides; a negative lens L9 provided a concave surface at the image focusing side; a cemented lens in which a biconvex lens L10 provided an aspherical surface at object side and a meniscus lens L11 having negative refractive power provided a concave surface at the object side are cemented; and a cemented lens in which a meniscus lens L12 having negative refractive power provided a concave surface at the image focusing side and a biconvex lens L13 are cemented. The fourth lens group G4 is composed of: a cemented lens in which in order from the object side, a biconvex lens L14 and a biconcave lens L15 are cemented. The fifth lens group G5 is composed of a meniscus lens L16 having negative refractive power provided a concave surface at the object side. The sixth lens group G6 is composed of a meniscus lens L17 having positive refractive power provided a convex surface at the image focusing side.

In the zoom lens of the Example 3 having the structure described above, each of the lens groups moves as follows in magnification change from a wide-angle end to a telephoto end as shown in FIG. 9 with an arrow: the first lens group G1 moves toward the object side; the second lens group G2 moves toward the image focusing side along a convex track; the third lens group G3 moves toward the object side; the fourth lens group G4 moves toward the image focusing side with respect to the third lens group G3 along a convex track; the fifth lens group G5 moves toward the object side; and the sixth lens group G6 is a fixed lens group fixed with respect to the focusing surface. In addition, the fourth lens group G4 moves toward the image focusing side during focusing from infinity to a proximity object.

(2) Numeric Values in Example

In the Example 3, Table 9 shows lens data of a numeric values in Example 3 to which specific numeric values are applied. The lens data shown in Table 9 is similar to the lens data shown in Table 1.

TABLE 9

| NS | R | D | Nd | νd |
|---|---|---|---|---|
| 1 | 109.0553 | 1.5000 | 1.90366 | 31.31 |
| 2 | 52.5697 | 0.0100 | 1.56732 | 42.84 |
| 3 | 52.5697 | 5.5700 | 1.49700 | 81.61 |
| 4 | −146.2327 | 0.2000 | | |
| 5 | 39.5728 | 3.9700 | 1.61800 | 63.39 |
| 6 | 112.3407 | D(6) | | |
| 7 ASPH | 79.0234 | 0.2000 | 1.51460 | 49.96 |
| 8 | 65.0676 | 0.9000 | 1.91082 | 35.25 |
| 9 | 12.3717 | 4.1854 | | |
| 10 | −23.8730 | 0.7500 | 1.91082 | 35.25 |
| 11 | 42.3962 | 0.4930 | | |
| 12 | 28.5426 | 3.3730 | 1.92286 | 20.88 |
| 13 | −24.6589 | 1.0150 | | |
| 14 | −14.8587 | 0.7500 | 1.77250 | 49.62 |
| 15 | −49.5781 | D(15) | | |
| 16 STOP | 0.0000 | 1.5000 | | |
| 17 ASPH | 13.2954 | 3.2480 | 1.58313 | 59.46 |
| 18 ASPH | −32.0948 | 0.2000 | | |
| 19 | 62.5251 | 0.6200 | 1.86188 | 42.08 |
| 20 | 15.8491 | 2.0200 | | |
| 21 ASPH | 61.7390 | 2.8500 | 1.58313 | 59.46 |
| 22 | −15.2253 | 0.0100 | 1.56732 | 42.84 |
| 23 | −15.2253 | 0.6000 | 1.90766 | 33.41 |
| 24 | −25.8791 | 1.0200 | | |

TABLE 9-continued

| NS | R | D | Nd | νd |
|---|---|---|---|---|
| 25 | 109.2068 | 0.5800 | 1.91082 | 35.25 |
| 26 | 20.0859 | 0.0100 | 1.56732 | 42.84 |
| 27 | 20.0859 | 3.7247 | 1.61882 | 64.32 |
| 28 | −16.2282 | D(28) | | |
| 29 | 51.3428 | 1.6830 | 1.80518 | 25.46 |
| 30 | −75.7267 | 0.0100 | 1.56732 | 42.84 |
| 31 | −75.7267 | 0.6000 | 1.80420 | 46.50 |
| 32 | 15.6073 | D(32) | | |
| 33 | −18.5559 | 0.9000 | 1.80518 | 25.46 |
| 34 | −28.5021 | D(34) | | |
| 35 | −152.2485 | 2.3543 | 1.72916 | 54.67 |
| 36 | −38.5471 | 11.0000 | | |
| 37 | 0.0000 | 4.2000 | 1.51680 | 64.20 |
| 38 | 0.0000 | 1.0000 | | |

Table 10 shows aspherical surface coefficients and conic constants of the aspherical surface shown in Table 9 as well as Table 2 showing aspherical surface coefficients and conic constants.

TABLE 10

| ASPH | ϵ | A4 | A6 | A8 | A10 |
|---|---|---|---|---|---|
| 7 | 1.0000 | 1.19556e−005 | −5.12224e−008 | 4.21707e−010 | 2.89639e−012 |
| 17 | 1.0000 | −4.81203e−005 | −6.04617e−007 | 2.40398e−008 | −4.15344e−010 |
| 18 | 1.0000 | 1.17843e−004 | −9.32847e−007 | 2.61092e−008 | −4.24829e−010 |
| 21 | 1.0000 | −5.75515e−006 | −1.80638e−007 | 2.44731e−009 | −5.43340e−012 |

Next, Table 11 shows a face distance in a wide-angle end (f=14.43), an intermediate focal length (f=57.85), and a telephoto end (f=145.40) in the numeric values in Example 3 as well as a focal length (f), an F-number (F-No.), and a field angle (ω).

TABLE 11

| f | 14.43 | 57.85 | 145.40 |
|---|---|---|---|
| F-No. | 3.6708 | 5.4085 | 5.9148 |
| ω | 37.102 | 10.651 | 3.671 |
| D(6) | 1.1330 | 24.2823 | 41.7003 |
| D(15) | 21.7353 | 5.4909 | 1.7000 |
| D(28) | 1.4374 | 6.0872 | 3.6419 |
| D(32) | 12.1029 | 7.4531 | 9.8984 |
| D(34) | 1.0300 | 19.1189 | 24.8250 |

Table 12 shows a face distance during focusing on an proximity object in a wide-angle end (f=14.43), an intermediate focal length (f=57.85), and a telephoto end (f=145.40) in the numeric values in Example 3 as well as a focal length (f) during focusing on an infinite object, and a distance (D(0)) from a first lens surface to an object.

TABLE 12

| f | 14.43 | 57.85 | 145.40 |
|---|---|---|---|
| D(0) | 901.52 | 876.67 | 857.15 |
| D(28) | 1.5087 | 6.7510 | 6.5503 |
| D(32) | 12.0316 | 6.7893 | 6.9900 |

Figure 10:
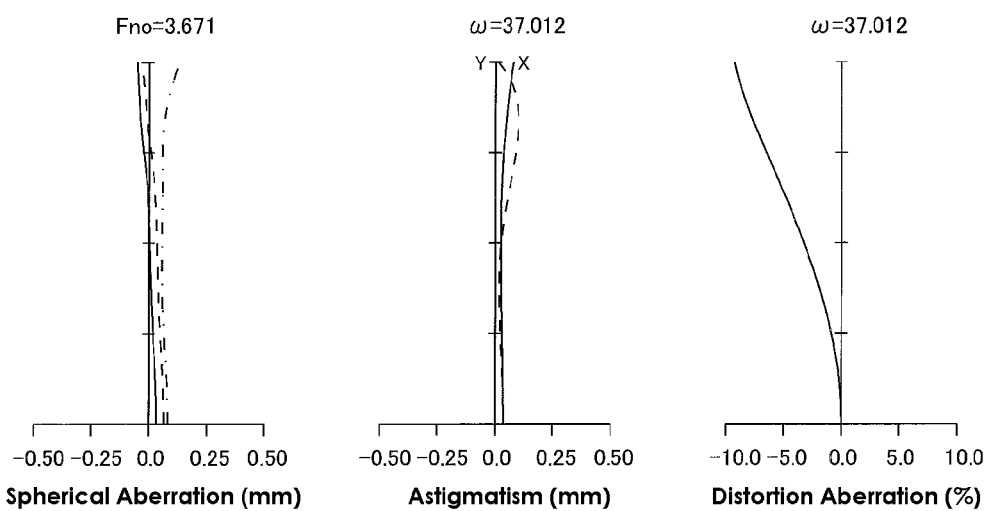
FIG. 10 includes a spherical aberration graph, an astigmatism graph, and a distortion aberration graph at the wide-angle end focusing infinity in the zoom lens of the Example 3 according to the present invention.
Figure 11:
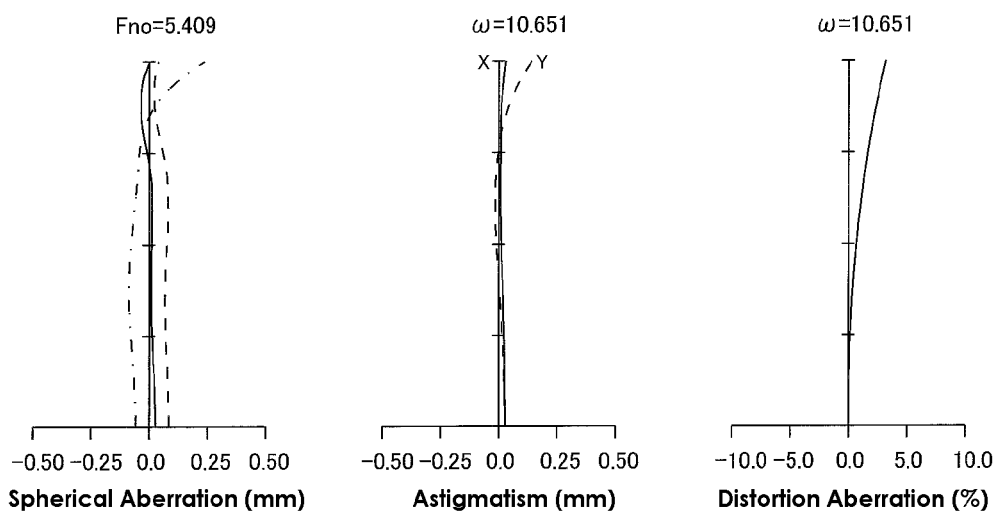
FIG. 11 includes a spherical aberration graph, an astigmatism graph, and a distortion aberration graph at an intermediate focal length focusing infinity in the zoom lens of the Example 3 according to the present invention.
Figure 12:
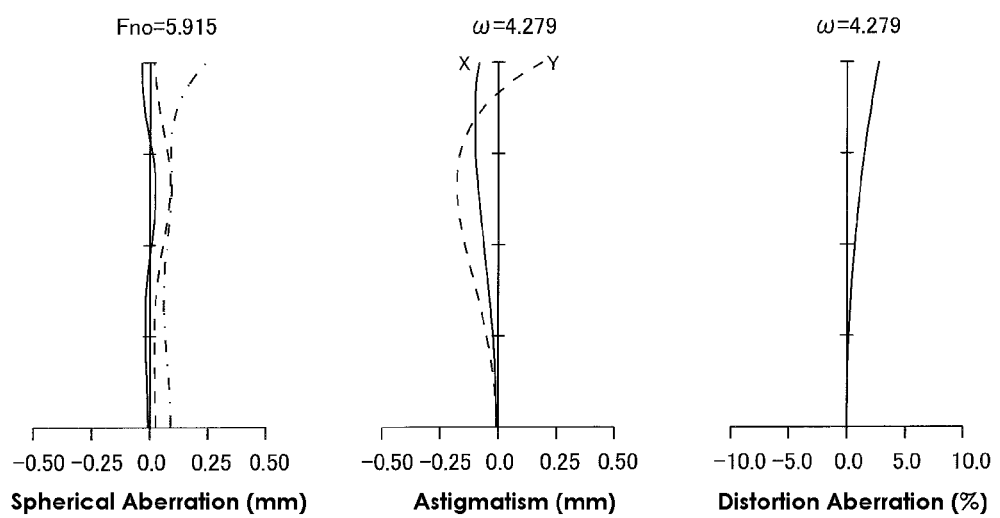
FIG. 12 includes a spherical aberration graph, an astigmatism graph, and a distortion aberration graph at a telephoto end focusing infinity in the zoom lens of the Example 3 according to the present invention.

FIG. 10 shows spherical aberration, astigmatism, and distortion aberration, during focusing on infinity of the zoom lens of the numeric values in Example 3 above in a wide-angle end. FIG. 11 shows spherical aberration, astigmatism, and distortion aberration, during focusing on infinity of the zoom lens in an intermediate focal length. FIG. 12 shows spherical aberration, astigmatism, and distortion aberration, during focusing on infinity of the zoom lens in a telephoto end.

Example 4

(1) Example of a Structure of a Zoom Lens

Figure 13:
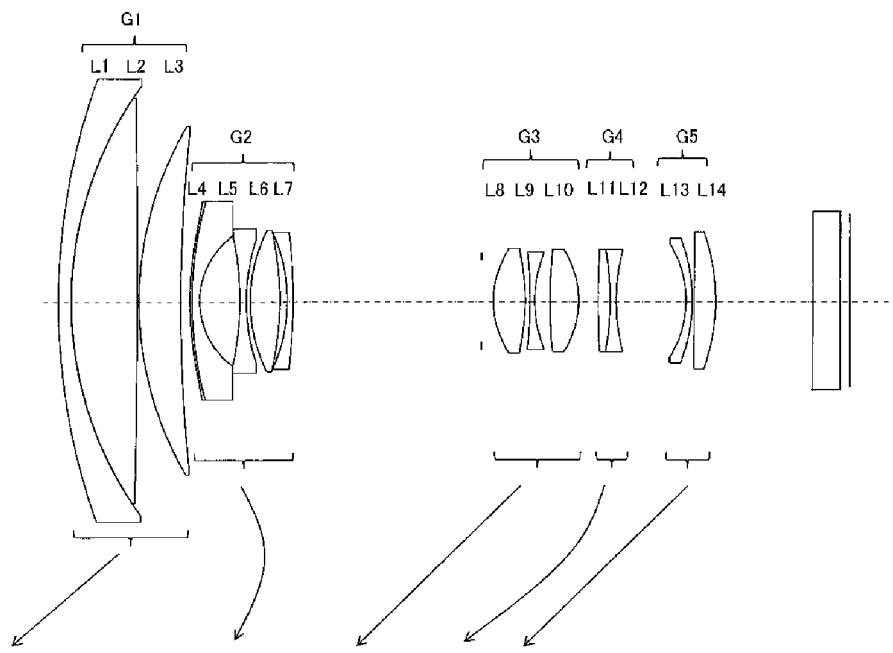
FIG. 13 is a schematic cross-sectional view of the zoom lens of the Example 4 according to the present invention showing a structure of the zoom lens at a wide-angle end.

FIG. 13 shows a lens structure of a zoom lens of the Example 4. As shown in FIG. 13, the zoom lens of the Example 4 is composed of, in order from an object side: a first lens group G1 having positive refractive power; a second lens group G2 having negative refractive power; a third lens group G3 having positive refractive power; a fourth lens group G4 having negative refractive power; and a fifth lens group G5 having negative refractive power.

The first lens group G1 is composed of: in order from the object side, a cemented lens in which a meniscus lens L1 having a negative refractive power provided a convex surface at the object side, and a lens L2 having positive refractive power are cemented; and a meniscus lens L3 having a positive refractive power provided a convex surface at the object side. The second lens group G2 is composed of: in order from the object side, a meniscus lens L4 having negative refractive power provided a large concave curvature surface at the object side and an aspherical surface at image focusing side; a biconcave lens L5; a biconvex lens L6; and a meniscus lens L7 having negative refractive power provided a concave surface at the object side. The third lens group G3 is composed of: in order from the object side, a biconvex lens L8 provided an aspherical surface at both sides; a biconcave lens L9; and biconvex lens L10. The forth lens group G4 is composed of a cemented lens in which, in order from the object side, a biconvex lens L11 and a biconcave lens L12 provided an aspherical surface at image focusing side are cemented. The fifth lens group G5 is composed of: a meniscus lens L13 having negative refractive power provided a concave surface at the object side; and a meniscus lens L14 having positive refractive power provided a convex surface at the image focusing side.

In the zoom lens of the Example 4 having the structure described above, each of the lens groups moves as follows in magnification change from a wide-angle end to a telephoto end as shown in FIG. 13 with an arrow: the first lens group G1 moves toward the object side; the second lens group G2 moves toward the image focusing side along a convex track; the third lens group G3 moves toward the object side; the fourth lens group G4 moves toward the image focusing side with respect to the third lens group G3 along a convex track; and the fifth lens group G5 moves toward the object side. In addition, the fourth lens group G4 moves toward the image focusing side during focusing from infinity to a proximity object.

(2) Numeric Values in Example

In the Example 4, Table 13 shows lens data of a numeric values in Example 4 to which specific numeric values are applied. The lens data shown in Table 13 is similar to the lens data shown in Table 1.

TABLE 13

| NS | R | D | Nd | νd |
|---|---|---|---|---|
| 1 | 64.9819 | 1.3000 | 1.90366 | 31.31 |
| 2 | 36.3975 | 0.0100 | 1.56732 | 42.84 |
| 3 | 36.3975 | 6.6600 | 1.49700 | 81.61 |
| 4 | −1186.1757 | 0.2000 | | |
| 5 | 34.2934 | 4.2232 | 1.61800 | 63.39 |
| 6 | 162.5347 | D(6) | | |
| 7 ASPH | 33.6698 | 0.2000 | 1.51460 | 49.96 |
| 8 | 36.8067 | 0.8000 | 1.91082 | 35.25 |
| 9 | 8.1262 | 4.0531 | | |
| 10 | −29.8667 | 0.6500 | 1.91082 | 35.25 |
| 11 | 20.0064 | 0.4000 | | |
| 12 | 15.8824 | 2.9802 | 1.92286 | 20.88 |
| 13 | −31.7119 | 0.7663 | | |
| 14 | −16.6818 | 0.6000 | 1.77250 | 49.62 |
| 15 | −54.0405 | D(15) | | |
| 16 STOP | 0.0000 | 1.2000 | | |
| 17 ASPH | 9.0025 | 3.2330 | 1.58313 | 59.46 |
| 18 ASPH | −17.0238 | 0.4600 | | |
| 19 | −52.2330 | 0.5000 | 1.90366 | 31.31 |
| 20 | 12.6447 | 1.5345 | | |
| 21 | 46.2818 | 2.9182 | 1.59282 | 68.62 |
| 22 | −9.5695 | D(22) | | |
| 23 | 100.3805 | 1.2000 | 1.80518 | 25.46 |
| 24 | −28.6956 | 0.0100 | 1.56732 | 42.84 |
| 25 | −28.6956 | 0.6000 | 1.80139 | 45.45 |
| 26 ASPH | 19.7020 | D(26) | | |
| 27 | −10.7494 | 0.6300 | 1.80518 | 25.46 |
| 28 | −17.3803 | 0.2000 | | |
| 29 | −4854.1028 | 2.1691 | 1.48749 | 70.44 |
| 30 | −20.5041 | D(30) | | |
| 31 | 0.0000 | 9.8000 | | |
| 32 | 0.0000 | 2.8000 | 1.51680 | 64.20 |
| 33 | 0.0000 | 1.0000 | | |

Table 14 shows aspherical surface coefficients and conic constants of the aspherical surface shown in Table 13 as well as Table 2 showing aspherical surface coefficients and conic constants.

TABLE 14

| ASPH | ε | A4 | A6 | A8 | A10 |
|---|---|---|---|---|---|
| 7 | 1.0000 | −1.81150e−006 | −3.53409e−007 | 2.30973e−009 | −1.22024e−011 |
| 17 | 1.0000 | −1.28660e−004 | 1.17974e−006 | −4.72888e−008 | −2.76128e−009 |
| 18 | 1.0000 | 4.39407e−004 | 1.33550e−006 | −1.82741e−007 | 0.00000e+000 |
| 26 | 1.0000 | −2.01216e−005 | −1.13690e−006 | 1.04261e−007 | −2.22909e−009 |

Next, Table 15 shows a face distance in a wide-angle end (f=10.31), an intermediate focal length (f=41.50), and a telephoto end (f=100.60) in the numeric values in Example 4 as well as a focal length (f), an F-number (F-No.), and a field angle (ω).

TABLE 15

| f | 10.31 | 41.50 | 100.60 |
|---|---|---|---|
| F-No. | 3.657 | 5.267 | 5.799 |
| ω | 40.1947 | 10.9138 | 4.5726 |

TABLE 15-continued

| | | | |
|---|---|---|---|
| D(6) | 0.9310 | 19.9590 | 33.2042 |
| D(15) | 19.0512 | 4.6009 | 1.6230 |
| D(22) | 1.9788 | 3.7822 | 0.5120 |
| D(26) | 7.0763 | 5.2729 | 8.5431 |
| D(30) | 0.0000 | 13.7884 | 20.1450 |

Table 16 shows a face distance during focusing on an proximity object in a wide-angle end (f=10.31), an intermediate focal length (f=41.50), and a telephoto end (f=100.60) in the numeric values in Example 4 as well as a focal length (f) during focusing on an infinite object, and a distance (D(0)) from a first lens surface to an object.

TABLE 16

| | | | |
|---|---|---|---|
| f | 10.31 | 41.50 | 100.60 |
| D(0) | 919.86 | 901.49 | 884.90 |
| D(22) | 2.0430 | 4.3047 | 2.5769 |
| D(26) | 7.0121 | 4.7504 | 6.4782 |

Figure 14:
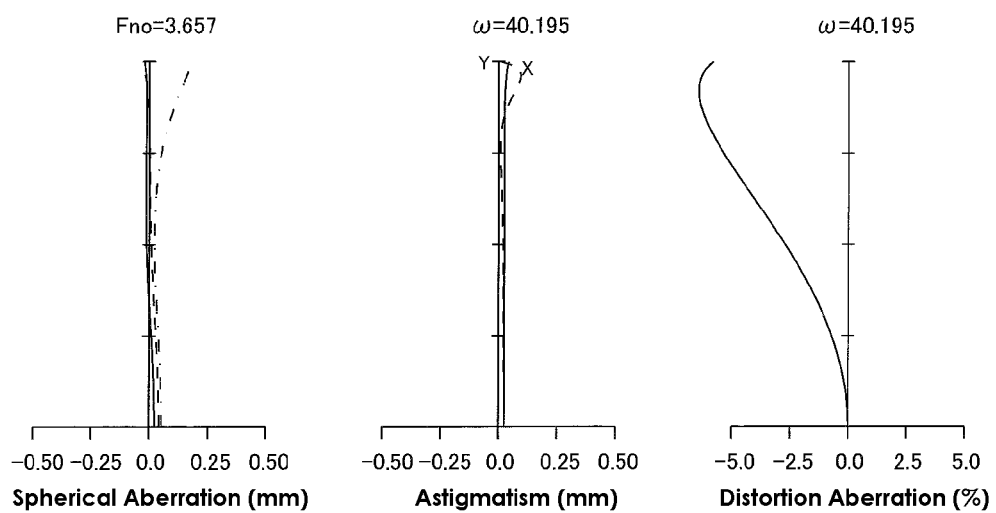
FIG. 14 includes a spherical aberration graph, an astigmatism graph, and a distortion aberration graph at the wide-angle end focusing infinity in the zoom lens of the Example 4 according to the present invention.
Figure 15:
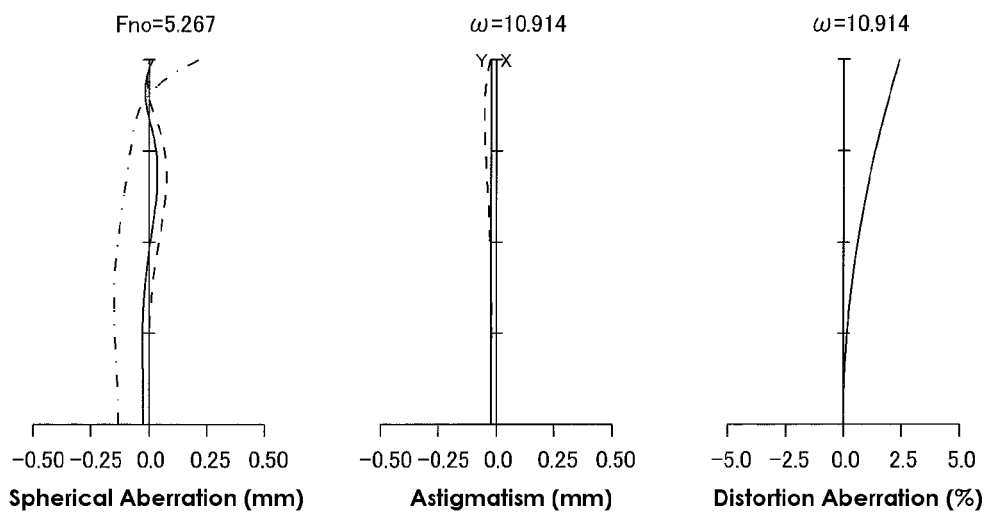
FIG. 15 includes a spherical aberration graph, an astigmatism graph, and a distortion aberration graph at an intermediate focal length focusing infinity in the zoom lens of the Example 4 according to the present invention.
Figure 16:
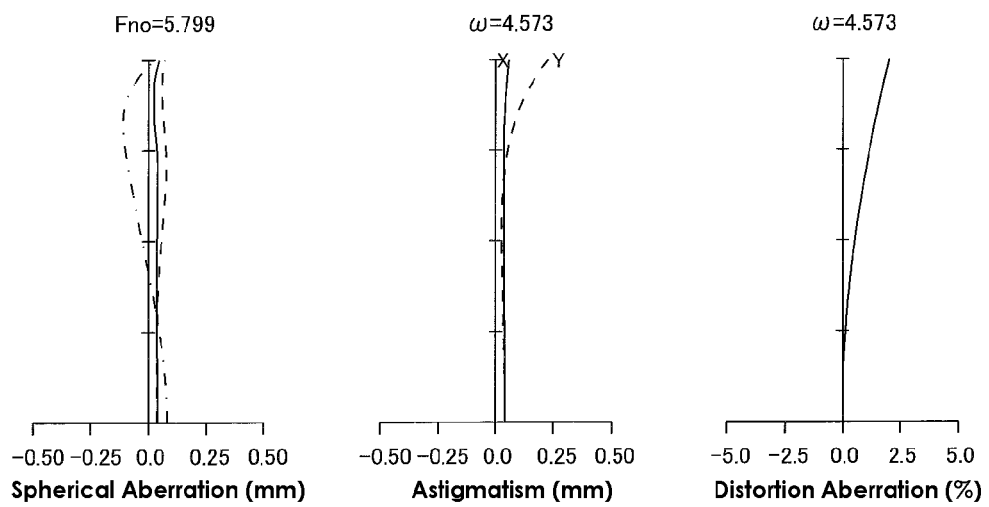
FIG. 16 includes a spherical aberration graph, an astigmatism graph, and a distortion aberration graph at a telephoto end focusing infinity in the zoom lens of the Example 4 according to the present invention.

FIG. 14 shows spherical aberration, astigmatism, and distortion aberration, during focusing on infinity of the zoom lens of the numeric values in Example 4 above in a wide-angle end. FIG. 15 shows spherical aberration, astigmatism, and distortion aberration, during focusing on infinity of the zoom lens in an intermediate focal length. FIG. 16 shows spherical aberration, astigmatism, and distortion aberration, during focusing on infinity of the zoom lens in a telephoto end.

Example 5

(1) Example of a Structure of a Zoom Lens

Figure 17:
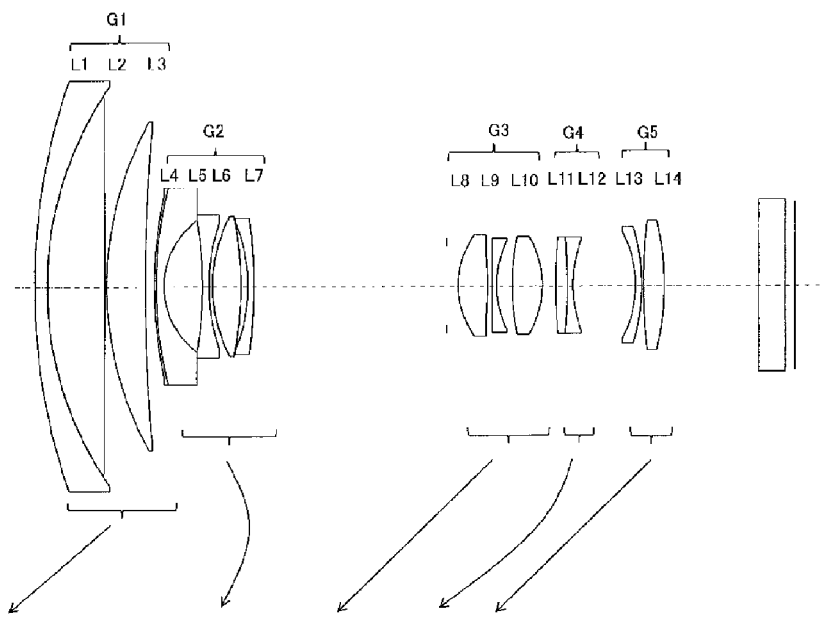
FIG. 17 is a schematic cross-sectional view of the zoom lens of the Example 5 according to the present invention showing a structure of the zoom lens at a wide-angle end.

FIG. 17 shows a lens structure of a zoom lens of the Example 5. As shown in FIG. 17, the zoom lens of the Example 5 is composed of, in order from an object side: a first lens group G1 having positive refractive power; a second lens group G2 having negative refractive power; a third lens group G3 having positive refractive power; a fourth lens group G4 having negative refractive power; and a fifth lens group G5 having negative refractive power.

The first lens group G1 is composed of: in order from the object side, a cemented lens in which a meniscus lens L1 having a negative refractive power provided a convex surface at the object side and a lens L2 having positive refractive power are cemented; and a meniscus lens L3 having a positive refractive power provided a convex surface at the object side. The second lens group G2 is composed of: in order from the object side, a meniscus lens L4 provided an aspherical surface at the object side and a concave surface having a large curvature at the image focusing side, the meniscus lens L4 having negative refractive power; a biconcave lens L5; a biconvex lens L6; and a meniscus lens L7 having negative refractive power provided a concave surface at the object side. The third lens group G3 is composed of: in order from the object side, a biconvex lens L8 provided an aspherical surface at both sides; a biconcave lens L9; and biconvex lens L10. The fourth lens group G4 is composed of: a cemented lens in which in order from the object side, a biconvex lens L11 and a biconcave lens L12 provided an aspherical surface at the image focusing side are cemented. The fifth lens group G5 is composed of: a meniscus lens L13 having negative refractive power provided a concave surface at the object side; and a biconvex lens L14.

In the zoom lens of the Example 5 having the structure described above, each of the lens groups moves as follows in magnification change from a wide-angle end to a telephoto end as shown in FIG. 17 with an arrow: the first lens group G1 moves toward the object side; the second lens group G2 moves toward the image focusing side along a convex track; the third lens group G3 moves toward the object side; the fourth lens group G4 moves toward the image focusing side with respect to the third lens group G3 along a convex track; and the fifth lens group G5 moves toward the object side. In addition, the fourth lens group G4 moves toward the image focusing side during focusing from infinity to a proximity object.

(2) Numeric Values in Example

In the Example 5, Table 17 shows lens data of a numeric values in Example 5 to which specific numeric values are applied. The lens data shown in Table 17 is similar to the lens data shown in Table 1.

TABLE 17

| NS | R | D | Nd | vd |
|---|---|---|---|---|
| 1 | 65.0172 | 1.3000 | 1.91048 | 31.31 |
| 2 | 36.2100 | 0.0100 | 1.57046 | 42.84 |
| 3 | 36.2100 | 6.0000 | 1.49845 | 81.61 |
| 4 | −2179.5150 | 0.2000 | | |
| 5 | 35.2814 | 4.0027 | 1.62032 | 63.39 |
| 6 | 183.6531 | D(6) | | |
| 7 ASPH | 42.2125 | 0.2000 | 1.51700 | 49.96 |
| 8 | 42.6979 | 0.8000 | 1.91695 | 35.25 |
| 9 | 8.4806 | 4.0102 | | |
| 10 | −40.2053 | 0.6500 | 1.91695 | 35.25 |
| 11 | 19.8739 | 0.4000 | | |
| 12 | 15.7705 | 2.9108 | 1.93323 | 20.88 |
| 13 | −39.4484 | 0.7583 | | |
| 14 | −17.4656 | 0.6000 | 1.77621 | 49.62 |
| 15 | −52.0671 | D(15) | | |
| 16 STOP | 0.0000 | 1.2000 | | |
| 17 ASPH | 8.5883 | 3.0750 | 1.58547 | 59.46 |
| 18 ASPH | −25.0697 | 0.4400 | | |
| 19 | 171.5901 | 0.5000 | 1.91048 | 31.31 |
| 20 | 10.4093 | 1.6207 | | |
| 21 | 25.6522 | 3.1313 | 1.59489 | 68.62 |
| 22 | −9.9776 | D(22) | | |
| 23 | 46.2354 | 1.2000 | 1.81263 | 25.46 |
| 24 | −53.2640 | 0.0100 | 1.57046 | 42.84 |
| 25 | −53.2640 | 0.6000 | 1.80558 | 45.45 |
| 26 ASPH | 13.2084 | D(26) | | |
| 27 | −11.9913 | 0.6300 | 1.81263 | 25.46 |
| 28 | −21.7212 | 0.2000 | | |
| 29 | 57.2469 | 2.1490 | 1.48914 | 70.44 |
| 30 | −29.7248 | D(30) | | |
| 31 | 0.0000 | 2.8000 | 1.51872 | 64.20 |
| 32 | 0.0000 | 1.0000 | | |

Table 18 shows aspherical surface coefficients and conic constants of the aspherical surface shown in Table 17 as well as Table 2 showing aspherical surface coefficients and conic constants.

TABLE 18

| ASPH | ε | A4 | A6 | A8 | A10 |
|---|---|---|---|---|---|
| 7 | 1.0000 | 8.18698e−006 | −2.73054e−007 | 1.74363e−009 | −8.23298e−012 |
| 17 | 1.0000 | −1.01823e−004 | 2.84220e−006 | −6.99155e−008 | −7.96183e−010 |
| 18 | 1.0000 | 4.60590e−004 | 3.18830e−006 | −1.41926e−007 | 0.00000e+000 |
| 26 | 1.0000 | −1.47382e−005 | −1.68264e−006 | 1.30906e−007 | −2.85225e−009 |

Next, Table 19 shows a face distance in a wide-angle end (f=10.30), an intermediate focal length (f=38.91), and a telephoto end (f=100.21) in the numeric values in Example 5 as well as a focal length (f), an F-number (F-No.), and a field angle (ω).

TABLE 19

| f | 10.30 | 38.91 | 100.21 |
|---|---|---|---|
| F-No. | 3.6579 | 5.0177 | 5.8760 |
| ω | 40.250 | 11.571 | 4.601 |
| D(6) | 0.9300 | 21.0041 | 33.8012 |
| D(15) | 19.9939 | 5.7856 | 1.5907 |
| D(22) | 1.3754 | 2.5090 | 0.5000 |
| D(26) | 6.4996 | 5.3660 | 7.3750 |
| D(30) | 9.8031 | 20.7424 | 28.8244 |

Table 20 shows a face distance during focusing on an proximity object in a wide-angle end (f=10.30), an intermediate focal length (f=38.91), and a telephoto end (f=100.21) in the numeric values in Example 5 as well as a focal length (f) during focusing on an infinite object, and a distance (D(0)) from a first lens surface to an object.

TABLE 20

| f | 10.30 | 38.91 | 100.21 |
|---|---|---|---|
| D(0) | 921.00 | 904.19 | 887.51 |
| D(22) | 1.4167 | 2.8588 | 1.9523 |
| D(26) | 6.4584 | 5.0162 | 5.9227 |

Figure 18:
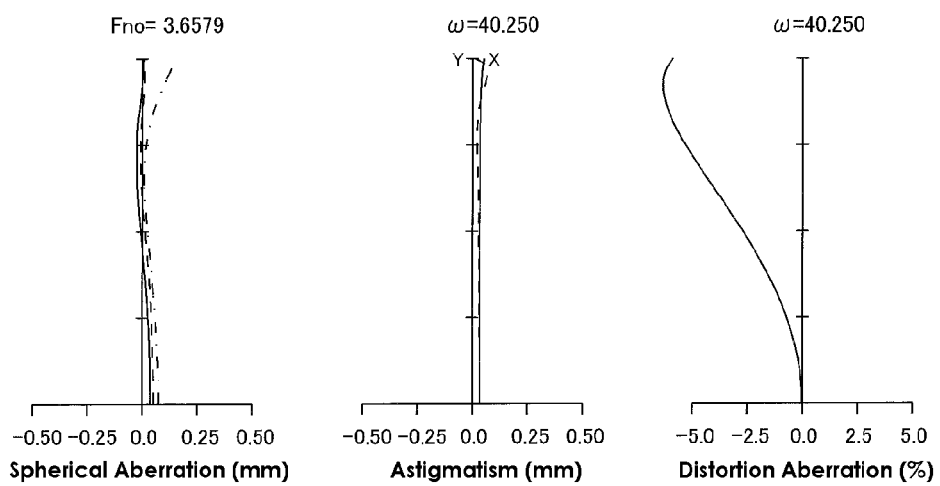
FIG. 18 includes a spherical aberration graph, an astigmatism graph, and a distortion aberration graph at the wide-angle end focusing infinity in the zoom lens of the Example 5 according to the present invention.
Figure 19:
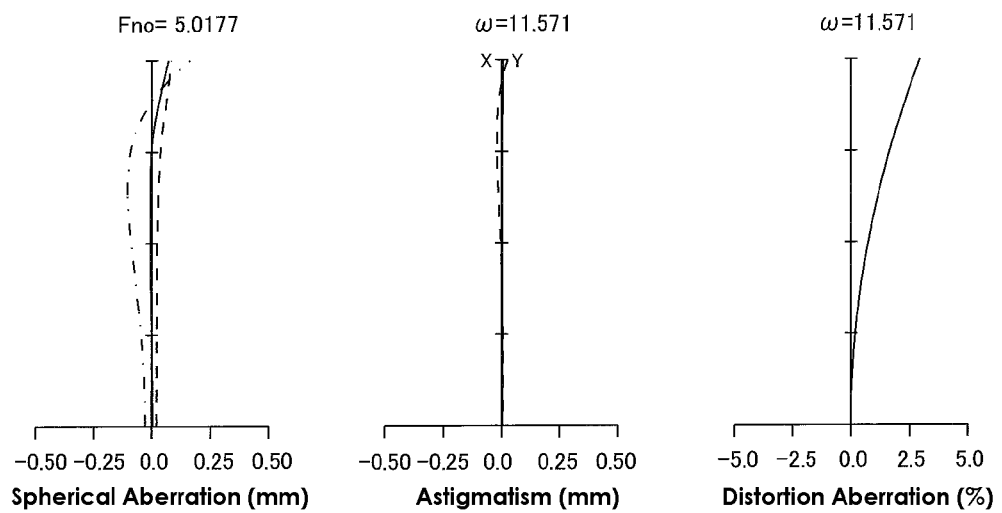
FIG. 19 includes a spherical aberration graph, an astigmatism graph, and a distortion aberration graph at an intermediate focal length focusing infinity in the zoom lens of the Example 5 according to the present invention.
Figure 20:
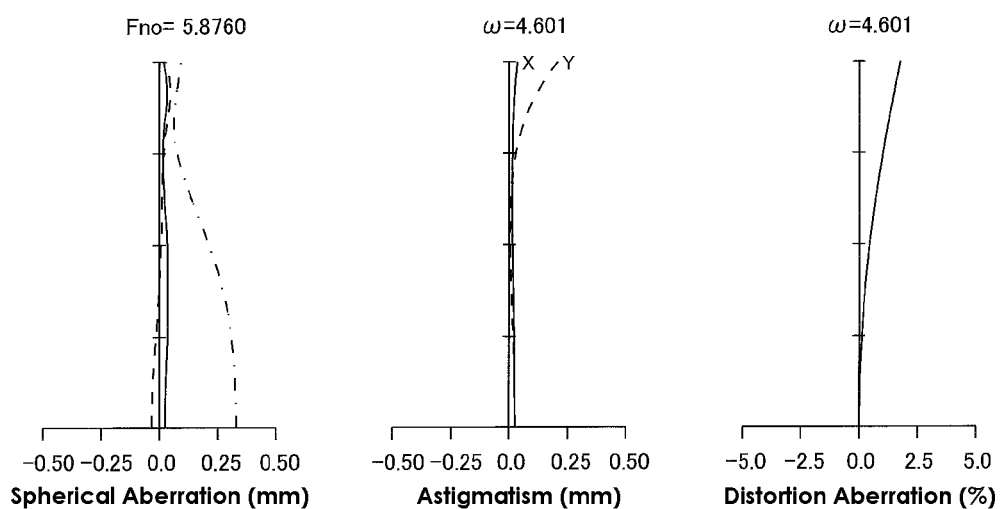
FIG. 20 includes a spherical aberration graph, an astigmatism graph, and a distortion aberration graph at a telephoto end focusing infinity in the zoom lens of the Example 5 according to the present invention.

FIG. 18 shows spherical aberration, astigmatism, and distortion aberration, during focusing on infinity of the zoom lens of the numeric values in Example 5 above in a wide-angle end. FIG. 19 shows spherical aberration, astigmatism, and distortion aberration, during focusing on infinity of the zoom lens in an intermediate focal length. FIG. 20 shows spherical aberration, astigmatism, and distortion aberration, during focusing on infinity of the zoom lens in a telephoto end.

Example 6

(1) Example of a Structure of a Zoom Lens

Figure 21:
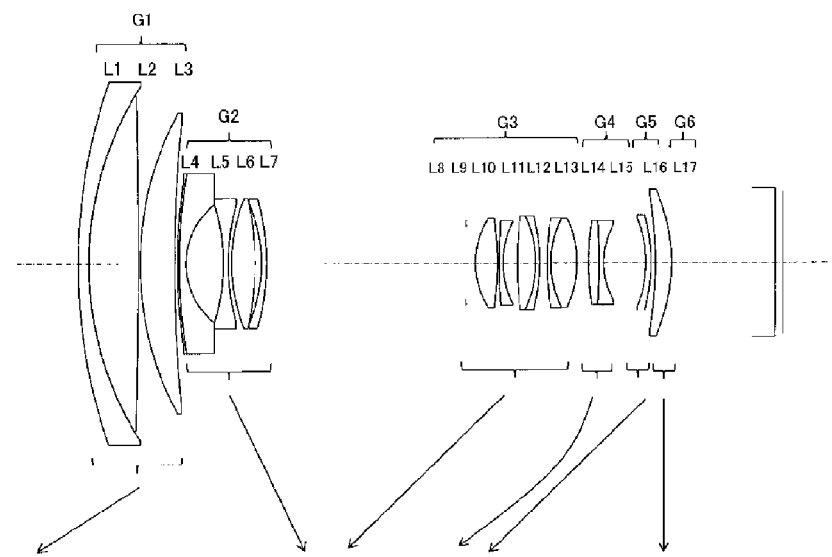
FIG. 21 is a schematic cross-sectional view of the zoom lens of the Example 6 according to the present invention showing a structure of the zoom lens at a wide-angle end.

FIG. 21 shows a lens structure of a zoom lens of the Example 6. As shown in FIG. 21, the zoom lens of the Example 6 is composed of, in order from an object side: a first lens group G1 having positive refractive power; a second lens group G2 having negative refractive power; a third lens group G3 having positive refractive power; a fourth lens group G4 having negative refractive power; a fifth lens group G5 having negative refractive power; and a sixth lens group G6 having positive refractive power.

The first lens group G1 is composed of: in order from the object side, a cemented lens in which a meniscus lens L1 having a negative refractive power provided a convex surface at the object side and a lens L2 having positive refractive power are cemented; and a meniscus lens L3 having a positive refractive power provided with a convex surface at the object side. The second lens group G2 is composed of: in order from the object side, a meniscus lens L4 provided an aspherical surface having a large curvature at the object side and a concave surface at the image focusing side, the meniscus lens L4 having negative refractive power; a biconcave lens L5; a biconvex lens L6; and a meniscus lens L7 having negative refractive power provided a concave surface at the object side. The third lens group G3 is composed of: in order from the object side, a biconvex lens L8 provided an aspherical surface at both sides; a negative lens L9 provided a concave surface at the image focusing side; a cemented lens in which a biconvex lens L10 provided an aspherical surface at the object side and a meniscus lens L11 having negative refractive power provided a concave surface at the object side are cemented; and a cemented lens in which a meniscus lens L12 having negative refractive power provided a concave surface at the image focusing side and a biconvex lens L13 are cemented. The fourth lens group G4 is composed of: a cemented lens in which in order from the object side, a biconvex lens L14 and a biconcave lens L15 are cemented. The fifth lens group G5 is composed of a meniscus lens L16 having negative refractive power provided a concave surface at the object side. The sixth lens group G6 is composed of a meniscus lens L17 having positive refractive power provided a convex surface at the image focusing side.

In the zoom lens of the Example 6 having the structure described above, each of the lens groups moves as follows in magnification change from a wide-angle end to a telephoto end as shown in FIG. 21 with an arrow: the first lens group G1 moves toward the object side; the second lens group G2 moves toward the image focusing side; the third lens group G3 moves toward the object side; the fourth lens group G4 moves toward the image focusing side with respect to the third lens group G3 along a convex track; the fifth lens group G5 moves toward the object side; and the sixth lens group G6 is a fixed lens group and is fixed with respect to the focusing surface. In addition, the fourth lens group G4 moves toward the image focusing side during focusing from infinity to a proximity object.

(2) Numeric Values in Example

In the Example 6, Table 21 shows lens data of a numeric values in Example 6 to which specific numeric values are applied. The lens data shown in Table 21 is similar to the lens data shown in Table 1.

TABLE 21

| NS | R | D | Nd | vd |
|---|---|---|---|---|
| 1 | 67.0027 | 1.3000 | 1.91048 | 31.31 |
| 2 | 40.2340 | 0.0100 | 1.57046 | 42.84 |
| 3 | 40.2340 | 6.0800 | 1.49845 | 81.61 |
| 4 | −794.8341 | 0.2000 | | |
| 5 | 38.8102 | 4.2157 | 1.59489 | 68.62 |
| 6 | 164.1604 | D(6) | | |
| 7 ASPH | 81.1825 | 0.2000 | 1.51700 | 49.96 |
| 8 | 67.7585 | 0.8000 | 1.91695 | 35.25 |
| 9 | 9.1243 | 4.5510 | | |

TABLE 21-continued

| NS | R | D | Nd | νd |
|---|---|---|---|---|
| 10 | −25.0778 | 0.6300 | 1.88622 | 40.16 |
| 11 | 27.2576 | 0.4000 | | |
| 12 | 20.6797 | 2.8798 | 1.93323 | 20.88 |
| 13 | −35.8254 | 0.7873 | | |
| 14 | −18.2251 | 0.6000 | 1.77621 | 49.62 |
| 15 | −29.9960 | D(15) | | |
| 16 STOP | 0.0000 | 1.2000 | | |
| 17 ASPH | 10.0444 | 2.7000 | 1.59625 | 44.39 |
| 18 ASPH | −26.2330 | 0.2000 | | |
| 19 | 87.7790 | 0.500 | 1.88288 | 33.76 |
| 20 | 11.5320 | 1.6800 | | |
| 21 ASPH | 40.2913 | 2.2800 | 1.58547 | 59.46 |
| 22 | −13.2420 | 0.0100 | 1.57046 | 42.84 |
| 23 | −13.2420 | 0.5000 | 1.91048 | 31.31 |
| 24 | −22.1094 | 0.8800 | | |
| 25 | 31.6556 | 0.5000 | 1.91695 | 35.25 |
| 26 | 12.2444 | 0.0100 | 1.57046 | 42.84 |
| 27 | 12.2444 | 3.1524 | 1.62032 | 63.39 |
| 28 | −13.1686 | D(28) | | |
| 29 | 34.3534 | 1.3430 | 1.81263 | 25.46 |
| 30 | −73.7708 | 0.0100 | 1.57046 | 42.84 |
| 31 | −73.7708 | 0.5000 | 1.80831 | 46.50 |
| 32 | 9.5086 | D(32) | | |
| 33 | −14.5628 | 0.6300 | 1.81263 | 25.46 |
| 34 | −22.8634 | D(34) | | |
| 35 ASPH | −52.1333 | 1.9752 | 1.73234 | 54.67 |
| 36 | −22.2809 | 9.8650 | | |
| 37 | 0.0000 | 2.8000 | 1.51872 | 64.20 |
| 38 | 0.0000 | 1.0000 | | |

Table 22 shows aspherical surface coefficients and conic constants of the aspherical surface shown in Table 21 as well as Table 2 showing aspherical surface coefficients and conic constants.

TABLE 22

| ASPH | ε | A4 | A6 | A8 | A10 |
|---|---|---|---|---|---|
| 7 | 1.0000 | 3.35886e−005 | −5.16900e−007 | 4.32183e−009 | −1.69535e−011 |
| 17 | 1.0000 | −1.00611e−004 | 9.45393e−007 | −3.09257e−008 | −3.45772e−010 |
| 18 | 1.0000 | 2.30712e−004 | −1.29334e−008 | −3.64331e−008 | 0.00000e+000 |
| 21 | 1.0000 | −1.81099e−005 | −2.09951e−007 | −8.74078e−009 | 3.55913e−010 |
| 35 | 1.0000 | −5.54443e−006 | 1.24920e−007 | −1.94726e−010 | 0.00000e+000 |

Table 23 shows a face distance in a wide-angle end (f=9.27), an intermediate focal length (f=48.39), and a telephoto end (f=130.94) in the numeric values in Example 6 as well as a focal length (f), an F-number (F-No.), and a field angle (ω).

TABLE 23

| f | 9.27 | 48.39 | 130.94 |
|---|---|---|---|
| F-No. | 3.5533 | 5.3868 | 5.8014 |
| ω | 43.132 | 9.317 | 3.534 |
| D(6) | 0.4150 | 27.3053 | 40.9217 |
| D(15) | 24.4257 | 6.4675 | 1.5000 |
| D(28) | 1.4080 | 2.8534 | 1.5255 |
| D(32) | 5.1559 | 3.7105 | 5.0383 |
| D(34) | 0.5160 | 15.9041 | 19.4150 |

Table 24 shows a face distance during focusing on an proximity object in each of states of a wide-angle end (f=9.27), an intermediate focal length (f=48.39), and a telephoto end (f=130.94) in the numeric values in Example 6 as well as a focal length (f) during focusing on an infinite object, and a distance (D(0)) from a first lens surface to an object in each of the states.

TABLE 24

| f | 9.27 | 48.39 | 130.94 |
|---|---|---|---|
| D(0) | 913.69 | 889.37 | 877.21 |
| D(28) | 1.4336 | 3.1627 | 3.1488 |
| D(32) | 5.1303 | 3.4012 | 3.4150 |

Figure 22:
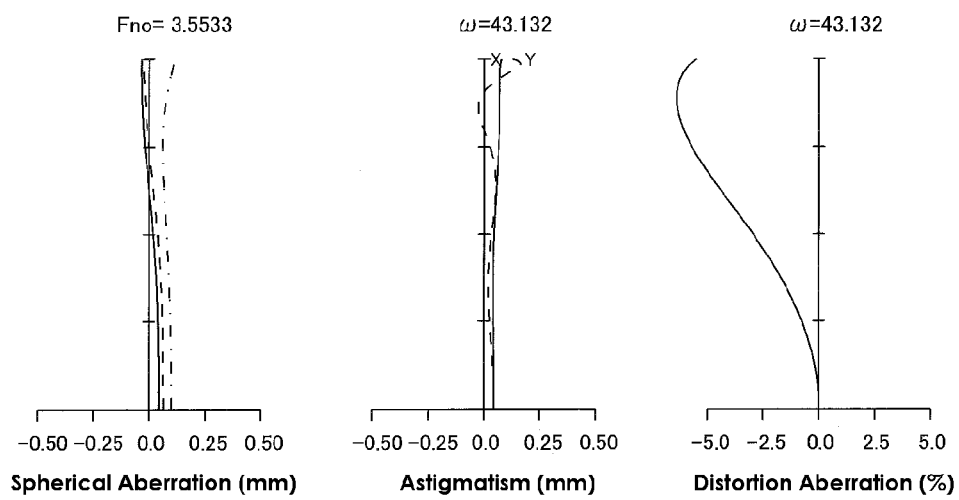
FIG. 22 includes a spherical aberration graph, an astigmatism graph, and a distortion aberration graph at the wide-angle end focusing infinity in the zoom lens of the Example 6 according to the present invention.
Figure 23:
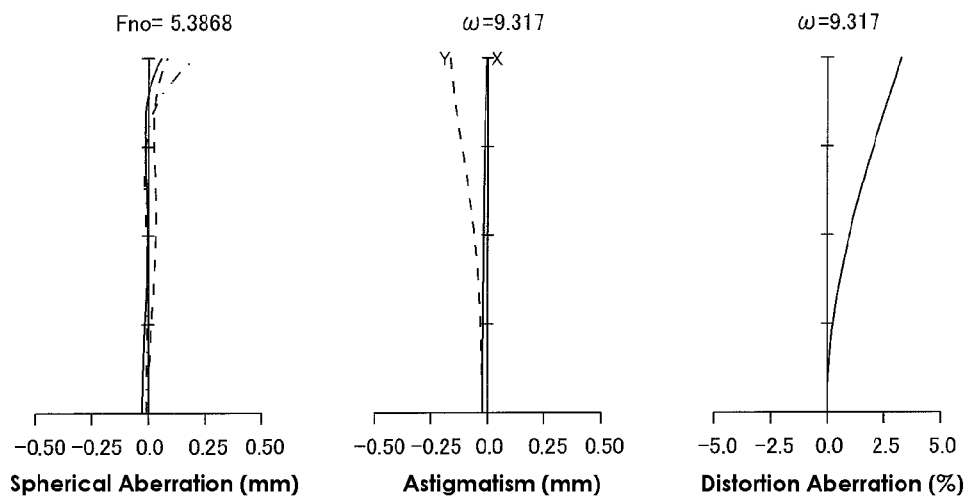
FIG. 23 includes a spherical aberration graph, an astigmatism graph, and a distortion aberration graph at an intermediate focal length focusing infinity in the zoom lens of the Example 6 according to the present invention.
Figure 24:
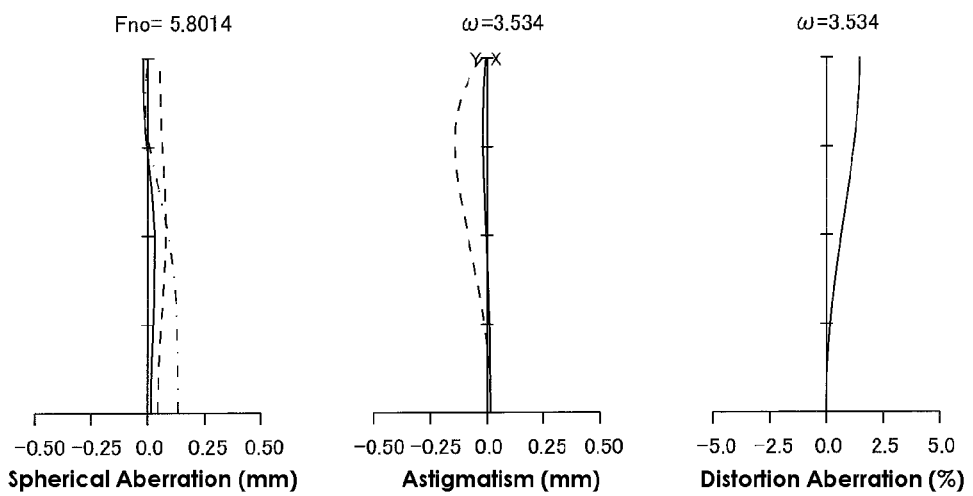
FIG. 24 includes a spherical aberration graph, an astigmatism graph, and a distortion aberration graph at a telephoto end focusing infinity in the zoom lens of the Example 6 according to the present invention.

FIG. 22 shows spherical aberration, astigmatism, and distortion aberration, during focusing on infinity of the zoom lens of the numeric values in Example 6 above in a wide-angle end. FIG. 23 shows spherical aberration, astigmatism, and distortion aberration, during focusing on infinity of the zoom lens in an intermediate focal length. FIG. 24 shows spherical aberration, astigmatism, and distortion aberration, during focusing on infinity of the zoom lens in a telephoto end.

Table 25 shows values of each of the expressions (1) to (6) above in a case where specific numeric values are applied to the zoom lenses of the Examples 1 to 6.

TABLE 25

| Expressions | Example 1 | Example 2 | Example 3 | Example 4 | Example 5 | Example 6 |
|---|---|---|---|---|---|---|
| (1) | 2.911 | 3.162 | 2.999 | 2.502 | 2.857 | 3.381 |
| (2) | −1.085 | −1.433 | −0.947 | −0.971 | −0.975 | −1.358 |
| (3) | 1.788 | 1.407 | 1.531 | 1.788 | 1.828 | 1.833 |
| (4) | 0.958 | 0.938 | 0.968 | 1.086 | 1.042 | 1.047 |
| (5) | 1.170 | 1.194 | 1.151 | 1.348 | 1.370 | 1.224 |
| (6) | −6.693 | −8.267 | −7.217 | −4.951 | −6.808 | −9.641 |

INDUSTRIAL APPLICABILITY

According to the present invention, a miniature telephoto zoom lens applied a telephoto system of so-called a telephoto type achieving not only high imaging performance by minimized movement of each of lens groups during zooming but also high variable magnification rate; and an imaging apparatus including the zoom lens are provided.

SYMBOL LIST

G1 ... first lens group
G2 ... second lens group
G3 ... third lens group
G4 ... fourth lens group
G5 ... fifth lens group
STOP ... diaphragm

The invention claimed is:
1. A zoom lens at least including, in order from an object side:
a first lens group having positive refractive power;
a second lens group having negative refractive power;
a third lens group having positive refractive power;
a fourth lens group having negative refractive power; and
a fifth lens group having negative refractive power, wherein focusing from infinity to a proximity of object is achieved by movement of just the fourth lens group toward an image focusing side and is characterized in Satisfaction of expressions below:

[Expression 1]

$$2.1 < \beta rt < 3.5 \quad (1)$$

$$-1.80 < \beta 2t < -0.94 \quad (2)$$

where "βrt" is composite lateral magnification at a telephoto end of lens groups locating closer to the image focusing side than the third lens group at infinity focusing, and "β2t" is lateral magnification at a telephoto end of the second lens group at infinity focusing.

2. The zoom lens according to claim 1, wherein the first lens group satisfies an expression below:

[Expression 2]

$$1.2 < f1/\sqrt{(fw \times ft)} < 2.1 \quad (3)$$

where "f1" is a focal length of the first lens group, "fw" is a focal length of the zoom lens at the wide-angle end, and "ft" is a focal length of the zoom lens at the telephoto end.

3. The zoom lens according to claim 1, wherein the first lens group satisfies an expression below:

[Expression 3]

$$0.7 < m1/\sqrt{(fw \times ft)} < 1.2 \quad (4)$$

where "m1" is a moving distance of the first lens group for magnification change from the wide-angle end to the telephoto end, "fw" is a focal length of the zoom lens at the wide-angle end, and "ft" is a focal length of the zoom lens at the telephoto end.

4. The zoom lens according to claim 1, wherein the fourth lens group satisfies an expression below:

[Expression 4]

$$1.05 < \beta 4t/\beta 4w < 1.45 \quad (5)$$

where "β4t" is lateral magnification at a telephoto end of the fourth lens group, and "β4w" is lateral magnification at a wide-angle end of the fourth lens group.

5. The zoom lens according to claim 1, wherein the fourth lens group satisfies an expression below:

[Expression 5]

$$(1-\beta 4t^2) \times \beta zt^2 < -4.5 \quad (6)$$

where "βzt" is lateral magnification at a telephoto end of a lens group locating closer to the image focusing side than the fourth lens group.

6. The zoom lens according to claim 1, wherein the third lens group and the fifth lens group move along the same track in magnification change from the wide-angle end to the telephoto end.

7. The zoom lens according to claim 1, wherein the fourth lens group first moves toward the image focusing side with respect to the third lens group followed by moving to an object side in magnification change from the wide-angle end to the telephoto end.

8. An imaging apparatus including:
the zoom lens according to claim 1; and
an image sensor provided on the image focusing side of the zoom lens, the image sensor converting an optical image focused by the zoom lens into an electric signal.

* * * * *